(12) United States Patent
Rands et al.

(10) Patent No.: US 12,521,370 B2
(45) Date of Patent: Jan. 13, 2026

(54) INHALABLE FORMULATIONS

(71) Applicant: CYBIN UK LTD, London (GB)

(72) Inventors: Peter Rands, London (GB); Ellen James, London (GB); Tiffanie Benway, London (GB); Zelah Joel, London (GB); Marie Layzell, London (GB)

(73) Assignee: Cybin UK Ltd, London (GB)

( * ) Notice: Subject to any disclaimer, the term of this patent is extended or adjusted under 35 U.S.C. 154(b) by 203 days.

(21) Appl. No.: 18/252,949

(22) PCT Filed: Dec. 1, 2021

(86) PCT No.: PCT/EP2021/083755
§ 371 (c)(1),
(2) Date: May 15, 2023

(87) PCT Pub. No.: WO2022/117640
PCT Pub. Date: Jun. 9, 2022

(65) Prior Publication Data
US 2024/0016782 A1    Jan. 18, 2024

Related U.S. Application Data

(63) Continuation-in-part of application No. 17/320,155, filed on May 13, 2021, now Pat. No. 12,042,564, and a continuation-in-part of application No. 17/208,583, filed on Mar. 22, 2021, now Pat. No. 11,773,062, and a continuation-in-part of application No. 17/108,938, filed on Dec. 1, 2020, now abandoned, and a continuation-in-part of application No. 17/108,679, filed on Dec. 1, 2020, now abandoned.

(30) Foreign Application Priority Data

| Dec. 1, 2020 | (GB) | 2018950 |
|---|---|---|
| Dec. 1, 2020 | (GB) | 2018955 |
| Mar. 22, 2021 | (GB) | 2103981 |
| Apr. 23, 2021 | (WO) | PCT/EP2021/060750 |
| May 13, 2021 | (CA) | CA 3118556 |
| May 13, 2021 | (GB) | 2106881 |
| May 13, 2021 | (WO) | PCT/EP2021/062794 |
| Nov. 18, 2021 | (TW) | 110143066 |
| Nov. 18, 2021 | (WO) | PCT/EP2021/082227 |

(51) Int. Cl.
*A61K 31/40* (2006.01)
*A61K 9/00* (2006.01)
*A61K 31/4045* (2006.01)
*A61K 47/10* (2017.01)

(52) U.S. Cl.
CPC .......... *A61K 31/4045* (2013.01); *A61K 9/007* (2013.01); *A61K 47/10* (2013.01)

(58) Field of Classification Search
CPC .............................................. A61K 31/4045
See application file for complete search history.

(56) References Cited

U.S. PATENT DOCUMENTS

| 4,336,378 | A | 6/1982 | Brand et al. |
|---|---|---|---|
| 8,268,856 | B2 | 9/2012 | Hamann et al. |
| 11,000,534 | B1 | 5/2021 | Sippy |
| 11,242,318 | B2 | 2/2022 | Nivorozhkin et al. |
| 11,406,619 | B2 | 8/2022 | Layzell et al. |
| 11,471,417 | B2 | 10/2022 | Rands et al. |
| 11,578,039 | B2 | 2/2023 | Rands et al. |
| 11,643,390 | B2 | 5/2023 | Rands et al. |
| 11,660,289 | B2 | 5/2023 | Rands et al. |
| 11,697,638 | B2 | 7/2023 | Rands et al. |
| 11,773,062 | B2 | 10/2023 | Rands et al. |
| 2002/0022667 | A1 | 2/2002 | Pace et al. |
| 2009/0076121 | A1 | 3/2009 | Czarnik |
| 2013/0129812 | A1 | 5/2013 | Ozpolat et al. |
| 2018/0221396 | A1 | 8/2018 | Chadeayne |
| 2020/0339519 | A1 | 10/2020 | Kim et al. |
| 2020/0390746 | A1 | 12/2020 | Rands et al. |
| 2020/0397752 | A1 | 12/2020 | Perez Castillo et al. |
| 2021/0378969 | A1 | 12/2021 | Rands et al. |
| 2021/0395201 | A1 | 12/2021 | Rands et al. |

(Continued)

FOREIGN PATENT DOCUMENTS

| GB | 2585978 A | 1/2021 |
|---|---|---|
| GB | 2586940 A | 3/2021 |

(Continued)

OTHER PUBLICATIONS

Halberstadt, et al. Psychopharmacology (2012) 221:709-718.*
Shafaat, et al. World Journal of Pharmacy and Pharmaceutical Sciences, Oct. 2013; vol. 2, issue 5, 2499-2515.*
Tombari et al., "Ex Vivo Analysis of Tryptophan Metabolism Using 19F NMR", ACS Chem. Biol., vol. 14, pp. 1866-1873. 2019.
Usach et al., "Subcutaneous Injection of Drugs: Literature Review of Factors Influencing Pain Sensation at the Injection Site", Adv. Ther., vol. 36, pp. 2986-2996. Only Cite in 006A Oct. 5, 2019.
Walker, et al., "Gas Chromatographic-Mass Spectrometric Isotope Dilution Assay for N,N-Dimethyltryptamine in Human Plasma", Biochemical Medicine, vol. 8, pp. 105-113 1973.
Yingxiang, "Drug Synthesis Reactions", (New World Era, 2nd edition), Beijing: China Press of Traditional Chinese Medicine, Aug. 2017, p. 134.

(Continued)

*Primary Examiner* — Shawquia Jackson
(74) *Attorney, Agent, or Firm* — Heslin Rothenberg Farley & Mesiti P.C.

(57) ABSTRACT

The present invention relates to inhalable formulations, and kits and methods suitable for the preparation of such inhalable formulations. The inhalable formulations comprise a freebase of a deuterium-substituted dimethyltryptamine compound. The inhalable formulations also comprise a biocompatible excipient. Such formulations are suitable for inhalation and have uses in the treatment of psychiatric or neurological disorders. Deuterium-substituted dimethyltryptamine compounds may be metabolised more slowly than their protio analogues, allowing for a longer lasting therapeutic effect.

23 Claims, 1 Drawing Sheet

(56) References Cited

U.S. PATENT DOCUMENTS

| | | |
|---|---|---|
| 2021/0403426 A1 | 12/2021 | Rands et al. |
| 2022/0062237 A1 | 3/2022 | Layzell et al. |
| 2022/0062238 A1 | 3/2022 | Layzell et al. |
| 2022/0081396 A1 | 3/2022 | Rands et al. |
| 2022/0168275 A1 | 6/2022 | Rands et al. |
| 2022/0202775 A1 | 6/2022 | Rands et al. |
| 2022/0281818 A1 | 9/2022 | Rands et al. |
| 2022/0313660 A1 | 10/2022 | Layzell et al. |
| 2023/0086574 A1 | 3/2023 | Rands et al. |
| 2023/0149293 A1 | 5/2023 | Rands et al. |
| 2023/0167056 A1 | 6/2023 | Rands et al. |
| 2023/0181530 A1 | 6/2023 | Rands et al. |
| 2023/0250059 A1 | 8/2023 | Rands et al. |

FOREIGN PATENT DOCUMENTS

| | | |
|---|---|---|
| GB | 2596884 A | 1/2022 |
| WO | 9300333 A1 | 1/1993 |
| WO | 02083144 A1 | 10/2002 |
| WO | 2004085392 A1 | 10/2004 |
| WO | 2008049116 A2 | 4/2008 |
| WO | 2008071455 A1 | 6/2008 |
| WO | 2008151584 A1 | 12/2008 |
| WO | 2009049030 A1 | 4/2009 |
| WO | 2018064465 A1 | 4/2018 |
| WO | 2018195455 A1 | 10/2018 |
| WO | 2019081764 A1 | 5/2019 |
| WO | 2020169850 A1 | 8/2020 |
| WO | 2020169851 A1 | 8/2020 |
| WO | 2020176597 A1 | 9/2020 |
| WO | 2020176599 A1 | 9/2020 |
| WO | 2020245133 A1 | 12/2020 |
| WO | 2021089872 A1 | 5/2021 |
| WO | 2021089873 A1 | 5/2021 |
| WO | 2021116503 A2 | 6/2021 |
| WO | 2021155470 A1 | 8/2021 |
| WO | 2021234608 A1 | 11/2021 |
| WO | 2021244831 A1 | 12/2021 |
| WO | 2022011350 A1 | 1/2022 |
| WO | 2022031566 A1 | 2/2022 |
| WO | 2022043227 A1 | 3/2022 |
| WO | 2022069690 A2 | 4/2022 |
| WO | 2022117359 A1 | 6/2022 |
| WO | 2022117640 A1 | 6/2022 |

OTHER PUBLICATIONS

Yu et al., "Stereospecific Deuterium Substitution at the a-Carbon Position of Dopamine and Its Effect on Oxidative Deamination Catalyzed by Mao-A and Mao-B From Different Tissues", Biochemical Pharmacology, vol. 35, No. 6, pp. 1027-1036. 1986.

Rands et al., Unpublished U.S. Appl. No. 17/574,424, filed Jan. 12, 2022.

Rands et al., Unpublished U.S. Appl. No. 18/602,171, filed Mar. 12, 2024.

Rands et al., Unpublished U.S. Appl. No. 18/711,130, filed May 17, 2024.

Rands et al. Unpublished U.S. Appl. No. 18/619,547, filed Mar. 28, 2024.

ABB "Freeze drying in the pharmaceutical industry" (https://new.abb.com/control-systems/industry-specific-solutions/pharmaceutical-and-life-sciences/freeze-drying-in-the-pharmaceutical-industry; accessed Feb. 9, 2023, archived via WayBack Machine; 4 pages. 2017.

Ambinter Screening Library, CAS Registry No. 1794811-18-9, Order No. Cat. Amb33838664 Mar. 26, 2020.

Aurora Building Blocks 2, CAS Registry No. 1435934-64-7, Order No. Cat A17.921.638. Feb. 27, 2020.

Barker et al., "Metabolism of the Hallucinogen N,N-Dimethyltryptamine in Rat Brain Homogenates", Biochemical Pharmacology, vol. 29, pp. 1049-1057. 1980.

Barker, et al., "Comparison of the Brain Levels of N N-Dimethyltryptamine and a,a,B,B-Tetradeutero N, N-Dimethyltryptamine Following Intraperitoneal Injection", Biochemical Pharmacology, vol. 31, No. 15, pp. 2513-2516 Jan. 20, 1982.

Barker, Steven A., "N, N-Dimethyltryptamine (DMT), an Endogenous Hallucinogen: Past, Present, and Future Research to Determine Its Role and Function", Frontiers in Neuroscience, vol. 12, Article 536, pp. 1-17 Aug. 6, 2018.

Beaton, et al., "A Comparison of the Behavioral Effects of Proteo- and Deutero-N, N-Dimethyltryptamine", Pharmacology, Biochemistry & Behavior, vol. 16, pp. 811-814 Sep. 8, 1982.

Blair et al., "Effect of Ring Fluorination on the Pharmacology of Hallucinogenic Tryptamines", J. Med. Chem., vol. 43, pp. 4701-4710. 2000.

Brandt, et al., "Microwave-Accelerated Synthesis of Psychoactive Deuterated N, N-Dialkylated-[a, a, •, • -d4]-Tryptamines", Journal of Labelled Compounds and Radiopharmaceuticals, vol. 51, No. 14, pp. 423-429 Nov. 1, 2008.

Brito-da-Costa et al. "Toxicokinetics and Toxicodynamics of Ayahuasca Alkaloids N, N-Dimethyltryptamine (DMT), Harmine, Harmaline and Tetrahydroharmine: Clinical and Forensic Impact", Pharmaceuticals, vol. 13, No. 334, 36 pages. Oct. 23, 2020.

Cai, "Monoamine oxidase inhibitors: Promising therapeutic agents for Alzheimers disease", Molecular Medicine Reports, 9(5), pp. 1533-1541. 2014.

Cameron, et el., "Effects of N,N-Dimethyltryptamine on Rat Behaviors Relevant to Anxiety and Depression", ACS Chemical Neuroscience, vol. 9, No. 7, pp. 1582-1590 2018.

Carbonaro et al., Neuropharmacology of N, N-Dimethyltryptamine, Brain Res Bull, 126, pp. 74-88. 2016.

Celik, et al., "Binding of Serotonin to the Human Serotonin Transporter. Molecular Modeling and Experimental Validation" Journal of the American Chemical Society, vol. 130, No. 12, pp. 3853-3865 Mar. 2008.

Celik, et al., "Supplementary Information to Binding of Serotonin to the Human Serotonin Transporter. Molecular Modeling and Experimental Validation", Journal of the American Chemical Society, 14 pages Mar. 2008.

Chemieliva Pharmaceutical Product, CAS Registry No. 1794756-39-0, "Supplementary Disclosures", Chemieliva Pharmaceutical Product List, Order No. Cat. CC0034145 Jan. 28, 2021.

Chemieliva Pharmaceutical Product, CAS Registry No. 1794811-18-9, "Supplementary Disclosures", Chemieliva Pharmaceutical Product List, Order No. Cat. CC0034141 Jan. 28, 2021.

Davis et al., "5-methoxy-N,N-dimethyltryptamine (5-MeO-DMT) used in a naturalistic group setting is associated with unintended improvements in depression and anxiety", The American Journal of Drug and Alcohol Abuse, 10 pages. Mar. 1, 2019.

Dragulska et al., "Isotope Effects in the Enzymatic Oxidation of Tryptamine to 3-indolyl-acetaldehyde", Isotopes in Environmental and Health Studies, vol. 50, No. 2, pp. 269-276. 2014.

Dunlap et al., "Identification of Psychoplastogenic N,N-Dimethylaminoisotryptamine (isoDMT) Analogues through Structure—Activity Relationship Studies", Journal of Medicinal Chemistry, vol. 63, pp. 1142-1155 2020.

Dunlap et al., "Reaction of N,N-Dimethyltryptamine with Dichloromethane Under Common Experimental Conditions", ACS Omega, vol. 3, pp. 4968-4973. 2018.

Dyck, et al., "Effect of Deuterium Substitution on the Disposition of Intraperitoneal Tryptamine", Biochemical Pharmacology, vol. 35, No. 17, pp. 2893-2896 1986.

Gaujac, et al., Investigations into the polymorphic properties of N,N-dimethyltryptamine by X-ray diffraction and differential scanning calorimetry, Microchemical Journal, vol. 110, pp. 146-157 2013.

Ghosal, et al., "Indole Bases of Desmodium Gyrans", Phytochemistry (Elsevier), vol. 11, No. 5, pp. 1863-1864 1972.

Grina, et al., "Old and New Alkaloids From Zanthoxylum Arborescens", Journal of Organic Chemistry, vol. 47, No. 13, pp. 2648-2651 1982.

Halberstadt, et al., "Behavioral effects of α,α,β,β-tetradeutero-5-MeO-DMT in rats: comparison with 5-MeO-DMT administered in combination with a monoamine oxidase inhibitor", Psychopharmacology, vol. 221, pp. 709-718. Jan. 6, 2012.

(56) References Cited

OTHER PUBLICATIONS

Hopkins et al., "Large-volume IM injections: A review of best practices", https://www.oncologynurseadvisor.com/home/hot-topics/chemotherapy/large-volume-im-injections-a-review-of-best-practices/; accessed Feb. 9, 2023, pp. 32-37. Feb. 2013.

Ibrahim, et al., "Marine inspired 2-(5-Halo-1 H-indol-3-yl)-N,N-dimethylethanamines as Modulators of Serotonin Receptors: An Example Illustrating the Power of Bromine as Part of the Uniquely Marine Chemical Space", Marine drugs, vol. 15, No. (8), pp. 248/1-248/14 2017.

Kargbo "5-MeO-DMT: Potential Use of Psychedelic-Induced Experiences in the Treatment of Psychological Disorders", ACS Med. Chem. Lett. vol. 12, pp. 1646-1648. 2021.

Mcilhenny, et al., "Direct Analysis of Psychoactive Tryptamine and Harmala Alkaloids in the Amazonian Botanical Medicine Ayahuasca by Liquid Chromatography-electrospray Ionization-tandem Mass Spectrometry", Journal of Chromatography A, vol. 1216, No. 51, 9 pages 2009.

Millrock Technology "What is Lyophilization?" (https://www.millrocktech.com/lyosight/lyobrary/what-is-lyophilization/; accessed Feb. 9, 2023, 2 pages. 2023.

Morris, et al., "Indolealkylamine Metabolism: Synthesis of Deuterated Indolealkylamines as Metabolic Probes", Journal of Labelled Compounds and Radiopharmaceuticals, John Wiley & Sons Ltd., vol. 33, No. 6, pp. 455-465 1993.

MuseChem Product List, CAS Registry No. 1794756-39-0, Order No. Cat. R055190. Apr. 21, 2020.

Pires et al., "Gas Chromatographic Analysis of Dimethyltryptamine and β-Carboline Alkaloids in Ayahuasca, an Amazonian Psychoactive Plant Beverage", Phytochemical Analysis, vol. 20, pp. 149-153. Jan. 12, 2009.

Queiroz, et al., "Chemical Composition of the Bark of Tetrapterys Mucronata and Identification of Acetylcholinesterase Inhibitory Constituents", Journal of Natural Products, vol. 77, No. 3, 2014, pp. 650-656 2014.

Rands et al., Unpublished U.S. Appl. No. 18/056,771, filed Nov. 18, 2022.

Rands et al., Unpublished U.S. Appl. No. 18/152,465, filed Jan. 10, 2023.

Rands et al., Unpublished U.S. Appl. No. 18/163,388, filed Feb. 2, 2023.

Rands et al., Unpublished U.S. Appl. No. 18/193,866, filed Mar. 31, 2023.

Reiff et al., "Psychedelics and Psychedelic-Assisted Psychotherapy", Am J. Psychiatry, 177:5, pp. 391-410. May 2020.

Riga, et al., The serotonin hallucinogen 5-MeO-DMT alters corticothalamic activity in freely moving mice: Regionally-selective involvement of 5-HT1A and 5-HT2A receptors, Neuropharmacology, vol. 142, pp. 219-230 2017.

Roseman et al., "Quality of Acute Psychedelic Experience Predicts Therapeutic Efficacy of Psilocybin for Treatment-Resistant Depression", Frontiers in Pharmacology, vol. 8, Article 974, 10 pages. Jan. 2018.

Sard, et al., "SAR of psilocybin analogs: Discovery of a selective 5-HT2c agonist", Bioorganic & Medicinal Chemistry Letters 15, vol. 15, No. 20, pp. 4555-4559 2005.

Servillo, et al., "Citrus Genus Plants Contain N-Methylated Tryptamine Derivatives and Their 5-Hydroxylated Forms", Journal of Agricultural and Food Chemistry, vol. 61, No. 21, pp. 5156-5162 2013.

Sherwood et al., "Synthesis and Characterization of 5-MeO-DMT Succinate for Clinical Use", ACS Omega, vol. 5, pp. 32067-32075. 2020.

Silveira et al., "Stability Evaluation of DMT and Harmala Alkaloids in Ayahuasca Tea Samples", Molecules, vol. 25, 11 pages. 2020.

Strassman et al., "Dose-Response Study of N, N-Dimethyltryptamine in Humans: II. Subjective Effects and Preliminary Results of a New Rating Scale", Archives of General Psychiatry, Chicago, IL, vol. 51(2), pp. 98-108 Feb. 1994.

Tearavarich et al. "Microwave-Accelerated Preparation and Analytical Characterization of 5-ethoxy-N,N-dialkyl-[α,α,β,β-H4]- and [α,α,β,β-D4]-tryptamines", Drug Testing and Analysis, vol. 3, No. 9, pp. 597-608 Dec. 2010.

Timmins, Expert Opin Ther Pat., 24(10), pp. 1067-1075. Oct. 2014.

Strassman et al., "Differential Tolerance to Biological and Subjective Effects of Four Closely Spaced Doses of N,N-Dimethyltryptamine in Humans", Biol. Psychiatry, vol. 39, pp. 784-795. 1996.

Timmermann et al., "Neural Correlates of the DMT Experience Assessed with Multivariate EEG", Scientific Reports, Nature Research, vol. 9, No. 16324, 13 pages. 2019.

Atzrodt et al. Deuterium- and Tritium-Labelled Compounds: Applications in the Life Sciences, Angew. Chem. Int. Ed., vol. 57, pp. 1758-1784. 2018.

Kazakevich et al., "HPLC For Pharmaceutical Scientists", Chapters 14 and 21, 71 pages. May 16, 2006.

\* cited by examiner

INHALABLE FORMULATIONS

CROSS REFERENCE TO RELATED APPLICATIONS

This application is a U.S. National Phase filing under 35 U.S.C. § 371 of International Application PCT/EP2021/083755, filed Dec. 1, 2021, and published as WO2022/117640A1 on Jun. 9, 2022. PCT/EP2021/083755 claims priority from Great Britain application number 2018950.2, filed Dec. 1, 2020, Great Britain application number 2018955.1 filed Dec. 1, 2020, U.S. application Ser. No. 17/108,679 filed Dec. 1, 2020, U.S. application Ser. No. 17/108,938 filed Dec. 1, 2020, Great Britain application number 2103981.3 filed Mar. 22, 2021, U.S. application Ser. No. 17/208,583 filed Mar. 22, 2021, International application number PCT/EP2021/060750 filed Apr. 23, 2021, Canadian application number 3,118,556 filed May 13, 2021, International application number PCT/EP2021/062794 filed May 13, 2021, Great Britain application number 2106881.2 filed May 13, 2021, United States application number 17/320,155 filed May 13, 2021, International application number PCT/EP2021/082227 filed Nov. 18, 2021 and Taiwan application number 110143066 filed Nov. 18, 2021. The entire contents of each of these prior applications are hereby incorporated herein by reference.

FIELD OF THE INVENTION

The present invention relates to parenteral formulations (i.e. formulations suitable for parenteral administration), preferably inhalable formulations, and kits and methods suitable for the preparation of such formulations. The parenteral (preferably inhalable) formulations comprise a freebase of a deuterium-substituted dimethyltryptamine compound. The parenteral (preferably inhalable) formulations also comprise a biocompatible excipient. Such formulations are suitable for inhalation and have uses in the treatment of psychiatric or neurological disorders. Deuterium-substituted dimethyltryptamine compounds may be metabolised more slowly than their protio-analogues, allowing for a longer lasting therapeutic effect.

BACKGROUND OF THE INVENTION

Classical psychedelics have shown preclinical and clinical promise in treating psychiatric disorders (Carhart-Harris and Goodwin, *Neuropsychopharmacology* 42, 2105-2113 (2017)).

N,N-dimethyltryptamine (DMT) is understood to hold therapeutic value as a short-acting psychedelic. A review of research into the biosynthesis and metabolism of DMT in the brain and peripheral tissues, methods and results for DMT detection in body fluids and the brain, new sites of action for DMT, and new data regarding the possible physiological and therapeutic roles of DMT is provided by S. A. Barker in *Front. Neurosci.*, 12, 536, 1-17 (2018). In this review, DMT is described as having a possible therapeutic role in the treatment of depression, obsessive-compulsive disorder, and substance abuse disorders.

5-Methoxy-N,N-dimethyltryptamine (5-MeO-DMT) is an endogenous tryptamine found in human blood, urine, and spinal fluid (S. A. Barker, E. H. McIlhenny and R. Strassman, *Drug Test. Anal.*, 2012, 4, 7-8, 617-635; F. Benington, R. D. Morin and L. C. Clark, *J. Med. Sci.*, 1965, 2, 397-403; F. Franzen, and H. Gross, *Nature*, 206, 1052; R. B. Guchhait., *J. Neurochem.*, 1976, 26, 1, 187-190), and has been shown to exhibit protective and therapeutically relevant effects. Anti-depressant properties have been shown in rodents administered 5-MeO-DMT (M. S. Riga et al., *Neuropharmacology*, 2017, 113, A, 148-155). In addition, a high number of users of 5-MeO-DMT, having ingested it in different forms, reported therapeutic effects attributed to its use, including improved post-traumatic stress disorder, depression and anxiety (A. K. Davis et al., *J. Psychopharmacol.*, 2018, 32, 7, 779-792). 5-MeO-DMT has also exhibited the potential to treat substance abuse disorders (V. Dakic et al., *Sci. Rep.*, 2017, 7, 12863).

Recently, the website vice.com carried out an interview with an anonymous chemist making and selling DMT vape pens (see https://www.vice.com/en/article/akzgbz/i-sell-dmt-vape-pens-so-people-can-break-through-at-their-own-speed, as available in November 2020). In the interview, the chemist describes the benefits of vaping DMT as "the ability to control how fast and how deep you want to go with each puff . . . You can still "break through" [the term for a full-blown DMT experience that involves extreme, visionary, psychedelic states] with enough hits. Or you can just have a light eyes-open, colourful trip that lasts around ten minutes. A mini-dose with gentle effects".

In the same interview, the problem of increasing the length of the "trip" experienced by the user is discussed. The chemist's approach in increasing "trip" length is to add some Banisteriopsis Caapi (an Amazonian jungle vine) extract to the formulation used. However, it is mentioned by the chemist that the resultant formulation can cause negative reactions for people on certain medications and would only extend the trip by five minutes.

In light of the therapeutic potential of DMT and substituted dimethyltryptamines, there remains a need in the art for formulations, in particular parenteral formulations suitable for inhalation, comprising such compounds with improved availability, extended and/or modified pharmacokinetics, in particular for the development of clinically applicable psychedelic drug substances to assist psychotherapy. The present invention addresses this need.

SUMMARY OF THE INVENTION

The present invention relates to formulations suitable for parenteral administration (preferably administration by inhalation), comprising a freebase of a deuterium-substituted DMT compound, and a biocompatible excipient. Such formulations are suitable for inhalation and have uses in the treatment of psychiatric or neurological disorders. As described above, there remains a need in the art for formulations comprising DMT and substituted DMTs with improved parenteral availability (preferably improved availability following inhalation). The inventors have found that formulations comprising a freebase of a deuterium-substituted compound are metabolised more slowly than formulations comprising protio analogues of these compounds, allowing for a longer lasting therapeutic effect.

The inventors have also found that the deuterium-substituted DMTs are more soluble in formulations suitable for parenteral administration (preferably administration by inhalation) when the compounds are in the form of a freebase rather than a salt.

Accordingly, viewed from a first aspect, the invention provides a parenteral (preferably inhalable) formulation comprising a freebase of a deuterium-substituted DMT compound, and a biocompatible excipient.

Viewed from a second aspect, the invention provides a kit suitable for preparing a parenteral (preferably inhalable)

formulation of the first aspect, said kit comprising a freebase of a deuterium-substituted DMT compound, and a biocompatible excipient, which is separate to the freebase.

Viewed from a third aspect, the invention provides a method of preparing a parenteral (preferably inhalable) formulation of the first aspect, comprising contacting a freebase of a deuterium-substituted DMT compound, with a biocompatible excipient.

Parenteral formulations, for example those suitable for inhalation, comprising a freebase of a DMT optionally substituted with deuterium, and a biocompatible excipient, have uses in the treatment of psychiatric or neurological disorders. Accordingly, viewed from a fourth aspect, the invention provides a parenteral (preferably inhalable) formulation of the first aspect, or a kit of the second aspect for use in therapy.

Viewed from a fifth aspect, the invention provides a parenteral (preferably inhalable) formulation of the first aspect, or a kit of the second aspect for use in a method of treating a psychiatric or neurological disorder in a patient.

Viewed from a sixth aspect, the invention provides a method of treating a psychiatric or neurological disorder comprising pulmonary administration to a patient in need thereof of a parenteral (preferably inhalable) formulation of the first aspect.

Further aspects and embodiments of the present invention will be evident from the discussion that follows below.

DETAILED DESCRIPTION OF THE INVENTION

Figure 1:
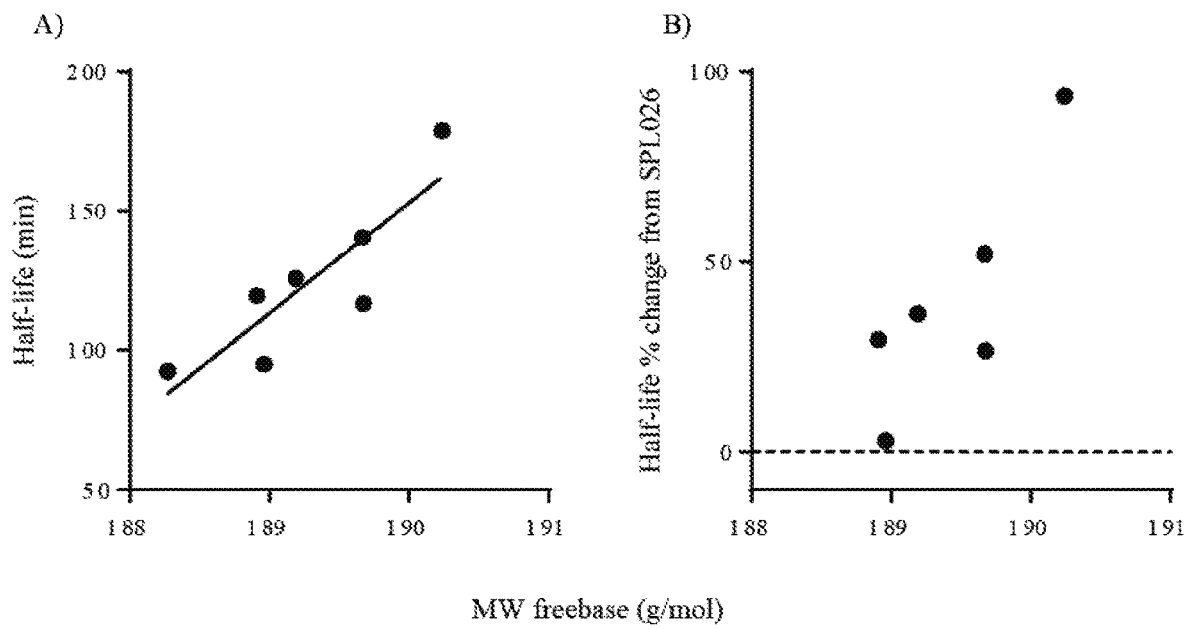
FIG. 1: plots calculated in vitro half-life for DMT and 6 deuterated-containing compositions described in the Examples section, below. A) Linear regression analysis. The $r^2$ value for half-life is 0.754; where the slope was found to be significantly different to zero, p=0.01. B) Half-life of deuterated analogues as a percent change from (undeuterated) DMT (dashed line).

Throughout this specification, one or more aspects of the invention may be combined with one or more features described in the specification to define distinct embodiments of the invention.

In the discussion that follows, reference is made to a number of terms, which are to be understood to have the meanings provided below, unless a context expressly indicates to the contrary. The nomenclature used herein for defining compounds, in particular the compounds described herein, is intended to be in accordance with the rules of the International Union of Pure and Applied Chemistry (IUPAC) for chemical compounds, specifically the "IUPAC Compendium of Chemical Terminology (Gold Book)" (see A. D. Jenkins et al., Pure & Appl. Chem., 1996, 68, 2287-2311). For the avoidance of doubt, if a rule of the IUPAC organisation is contrary to a definition provided herein, the definition herein is to prevail.

References herein to a singular of a noun encompass the plural of the noun, and vice-versa, unless the context implies otherwise. For example, "a biocompatible excipient" encompasses one or more biological excipients.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The term "comprising" includes within its ambit the term "consisting".

The term "consisting" or variants thereof is to be understood to imply the inclusion of a stated element, integer or step, or group of elements, integers or steps, and the exclusion of any other element, integer or step or group of elements, integers or steps.

The term "about" herein, when qualifying a number or value, is used to refer to values that lie within ±5% of the value specified. For example, if a concentration of freebase is specified to be about 1 mg/mL to about 1000 mg/mL, concentrations of 0.95 mg/mL to 1050 mg/mL are included.

The formulation defined in the first aspect is useful in therapy and may be administered to a patient in need thereof. As used herein, the term 'patient' preferably refers to a mammal. Typically the mammal is a human, but may also refer to a domestic mammal. The term does not encompass laboratory mammals.

The terms "treatment" and "therapy" define the therapeutic treatment of a patient, in order to reduce or halt the rate of progression of a disorder, or to ameliorate or cure the disorder. Prophylaxis of a disorder as a result of treatment or therapy is also included. References to prophylaxis are intended herein not to require complete prevention of a disorder: its development may instead be hindered through treatment or therapy in accordance with the invention. Typically, treatment or therapy is not prophylactic, and the formulations are administered to a patient having a diagnosed or suspected disorder.

Psychedelic-assisted psychotherapy means the treatment of a mental disorder by psychological means, which are enhanced by one or more protocols in which a patient is subjected to a psychedelic experience. A psychedelic experience is characterized by the striking perception of aspects of one's mind previously unknown, and may include one or more changes of perception with respect to hallucinations, synesthesia, altered states of awareness or focused consciousness, variation in thought patterns, trance or hypnotic states, and mystical states.

As is understood in the art, psychocognitive, psychiatric or neurological disorders are disorders which may be associated with one or more cognitive impairment. As used herein, the term 'psychiatric disorder' is a clinically significant behavioural or psychological syndrome or pattern that occurs in an individual and that is associated with present distress (e.g., a painful symptom) or disability (i.e., impairment in one or more important areas of functioning) or with a significantly increased risk of suffering death, pain, disability, or an important loss of freedom.

Diagnostic criteria for psychiatric or neurological disorders referred to herein are provided in the Diagnostic and Statistical Manual of Mental Disorders, Fifth Edition, (DSM-5).

As used herein the term 'obsessive-compulsive disorder' (OCD) is defined by the presence of either obsessions or compulsions, but commonly both. The symptoms can cause significant functional impairment and/or distress. An obsession is defined as an unwanted intrusive thought, image or urge that repeatedly enters the person's mind. Compulsions are repetitive behaviours or mental acts that the person feels driven to perform. Typically, OCD manifests as one or more obsessions, which drive adoption of a compulsion. For example, an obsession with germs may drive a compulsion to clean or an obsession with food may drive a compulsion to overeat, eat too little or throw up after eating (i.e. an obsession with food may manifest itself as an eating disorder). A compulsion can either be overt and observable by others, such as checking that a door is locked, or a covert mental act that cannot be observed, such as repeating a certain phrase in one's mind.

The term "eating disorder" includes anorexia nervosa, bulimia and binge eating disorder (BED). The symptoms of anorexia nervosa include eating too little and/or exercising too much in order to keep weight as low as possible. The symptoms of bulimia include eating a lot of food in a very short amount of time (i.e. binging) and then being deliberately sick, using laxatives, eating too little and/or exercising too much to prevent weight gain. The symptoms of BED include regularly eating large portions of food until uncomfortably full, and consequently feeling upset or guilty.

As used herein the term 'depressive disorder' includes major depressive disorder, persistent depressive disorder, bipolar disorder, bipolar depression, and depression in terminally ill patients.

As used herein the term 'major depressive disorder' (MDD, also referred to as major depression or clinical depression) is defined as the presence of five or more of the following symptoms over a period of two-weeks or more (also referred to herein as a 'major depressive episode'), most of the day, nearly every day:
depressed mood, such as feeling sad, empty or tearful (in children and teens, depressed mood can appear as constant irritability);
significantly reduced interest or feeling no pleasure in all or most activities;
significant weight loss when not dieting, weight gain, or decrease or increase in appetite (in children, failure to gain weight as expected);
insomnia or increased desire to sleep;
either restlessness or slowed behaviour that can be observed by others;
fatigue or loss of energy;
feelings of worthlessness, or excessive or inappropriate guilt;
trouble making decisions, or trouble thinking or concentrating;
recurrent thoughts of death or suicide, or a suicide attempt.

At least one of the symptoms must be either a depressed mood or a loss of interest or pleasure.

Persistent depressive disorder, also known as dysthymia, is defined as a patient exhibiting the following two features:
A. has depressed mood for most the time almost every day for at least two years. Children and adolescents may have irritable mood, and the time frame is at least one year.
B. While depressed, a person experiences at least two of the following symptoms:
Either overeating or lack of appetite.
Sleeping too much or having difficulty sleeping.
Fatigue, lack of energy.
Poor self-esteem.
Difficulty with concentration or decision-making.

As used herein the term 'treatment resistant major depressive disorder' describes MDD that fails to achieve an adequate response to an adequate treatment with standard of care therapy.

As used herein, 'bipolar disorder', also known as manic-depressive illness, is a disorder that causes unusual shifts in mood, energy, activity levels, and the ability to carry out day-to-day tasks.

There are two defined sub-categories of bipolar disorder; all of them involve clear changes in mood, energy, and activity levels. These moods range from periods of extremely "up," elated, and energised behaviour (known as manic episodes, and defined further below) to very sad, "down," or hopeless periods (known as depressive episodes). Less severe manic periods are known as hypomanic episodes.

Bipolar I Disorder—defined by manic episodes that last at least 7 days, or by manic symptoms that are so severe that the person needs immediate hospital care. Usually, depressive episodes occur as well, typically lasting at least 2 weeks. Episodes of depression with mixed features (having depression and manic symptoms at the same time) are also possible.

Bipolar II Disorder—defined by a pattern of depressive episodes and hypomanic episodes, but not the full-blown manic episodes described above.

As used herein 'bipolar depression' is defined as an individual who is experiencing depressive symptoms with a previous or coexisting episode of manic symptoms, but does not fit the clinical criteria for bipolar disorder.

As used herein, the term 'anxiety disorder' includes generalised anxiety disorder, phobia, panic disorder, social anxiety disorder, and post-traumatic stress disorder.

'Generalised anxiety disorder' (GAD) as used herein means a chronic disorder characterised by long-lasting anxiety that is not focused on any one object or situation. Those suffering from GAD experience non-specific persistent fear and worry, and become overly concerned with everyday matters. GAD is characterised by chronic excessive worry accompanied by three or more of the following symptoms: restlessness, fatigue, concentration problems, irritability, muscle tension, and sleep disturbance.

'Phobia' is defined as a persistent fear of an object or situation the affected person will go to great lengths to avoid, typically disproportional to the actual danger posed. If the feared object or situation cannot be avoided entirely, the affected person will endure it with marked distress and significant interference in social or occupational activities.

A patient suffering from a 'panic disorder' is defined as one who experiences one or more brief attack (also referred to as a panic attack) of intense terror and apprehension, often marked by trembling, shaking, confusion, dizziness, nausea, and/or difficulty breathing. A panic attack is defined as a fear or discomfort that abruptly arises and peaks in less than ten minutes.

'Social anxiety disorder' is defined as an intense fear and avoidance of negative public scrutiny, public embarrassment, humiliation, or social interaction. Social anxiety often manifests specific physical symptoms, including blushing, sweating, and difficulty speaking.

Post-traumatic stress disorder' (PTSD) is an anxiety disorder that results from a traumatic experience. Post-traumatic stress can result from an extreme situation, such as combat, natural disaster, rape, hostage situations, child abuse, bullying, or even a serious accident. Common symptoms include hypervigilance, flashbacks, avoidant behaviours, anxiety, anger and depression.

As used herein, the term "post-partum depression" (PPD, also known as postnatal depression) is a form of depression experienced by either parent of a newborn baby.

Symptoms typically develop within 4 weeks of delivery of the baby and often include extreme sadness, fatigue, anxiety, loss of interest or pleasure in hobbies and activities, irritability, and changes in sleeping or eating patterns.

As used herein, the term 'substance abuse' means a patterned use of a drug in which the user consumes the substance in amounts or with methods that are harmful to themselves or others.

As used herein, the term 'an avolition disorder' refers to a disorder that includes as a symptom the decrease in motivation to initiate and perform self-directed purposeful activities.

High-performance liquid chromatography (HPLC) is a technique in analytical chemistry used to separate, identify, and quantify each component in a mixture. For a review of HPLC, see A. M. Sabir et al., *Int. Res. J. Pharm.*, 2013, 4, 4, 39-46.

As described above, the invention provides in its first aspect a parenteral (preferably inhalable) formulation comprising a freebase of a deuterium-substituted DMT compound, and a biocompatible excipient.

By "parenteral formulation" is meant a formulation suitable for inhalation or nasal, or topical (including buccal, sublingual and transdermal) administration. The formulation (i.e. of the invention) is in accordance with Pharmacopeial requirements of sterility, contaminants, and pyrogens.

Sometimes, the formulation contains inhibitors of the growth of microorganisms (e.g. antimicrobial preservatives) and/or anti-oxidants.

In some embodiments, the parenteral formulation is suitable for inhalation, i.e. it is an inhalable formulation. For the avoidance of doubt, an inhalable formulation is capable of becoming airborne and entering the lungs of a patient through the action of the patient breathing in. In other words, inhalable formulations are suitable for pulmonary administration. The inhalable formulation may be inhaled in the form of a vapour, aerosol or gas. Often, the inhalable formulation is inhaled in the form of a vapour or aerosol.

The DMT compounds of use in connection with this invention are in the form of freebases. By "freebase" is meant that the amine within the DMT compound is in its unprotonated form, as opposed to the conjugate acid (protonated) form of the amine. Accordingly, salts of the DMT compounds are excluded from the scope of the freebase. For the avoidance of doubt, zwitterions comprising a protonated form of the amine and a negatively charged substituent bound to the DMT compound (such as the zwitterionic form of psilocybin) are excluded from the scope of the freebase.

In some embodiments freebase is optionally substituted at position 4 or 5 with acetoxy or methoxy. For the avoidance of doubt, positions 4 and 5 of the optionally substituted DMT compound refer to the positions labelled in the structure below (substitution not shown).

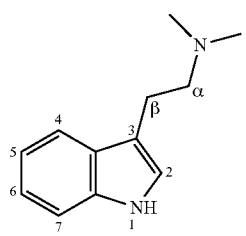

The DMT compound is substituted with deuterium, wherein a deuterium atom is a hydrogen atom with an additional neutron. For the avoidance of doubt, by a DMT compound (for example DMT itself or a substituted DMT such as 5-methoxy DMT) being substituted with deuterium is meant that such compounds are enriched with deuterium, i.e. they comprise a percentage of deuterium that is greater than the natural abundance of deuterium, which is about 0.015%. The deuterium of the deuterium-substituted DMT is typically bound to the alpha and/or beta positions of the compound (shown in the structure above). In particular embodiments, the carbon atom at the alpha position is bonded to at least one deuterium atom.

In some embodiments, the freebase is of Formula IA

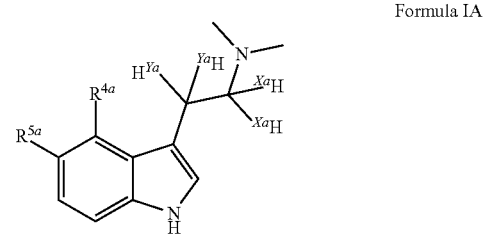

Formula IA wherein:
one $^{xa}H$ is D and the other is H or D; and
each $^{Ya}H$ is independently selected from H and D; and
$R^{4a}$ and $R^{5a}$ are both H; or one of $R^{4a}$ and $R^{5a}$ is H and the other is acetoxy (—OC(O)CH$_3$) or methoxy (—OCH$_3$).

In these embodiments, the compounds of Formula IA comprise at least one deuterium atom at the α-position. In preferred embodiments, the compounds of Formula IA comprise two hydrogen atoms at the β-position and at least one deuterium atom at the α-position. The inventors have found that such compounds are metabolised surprisingly slowly—substantially more slowly than their α-diprotic analogues—and consequently may have improved availability following inhalation, allowing for a longer lasting therapeutic effect.

In some embodiments, both $^{xa}H$ are D, i.e. the freebase is an α,α-dideutero compound.

In some embodiments, $R^{4a}$ and $R^{5a}$ are both H, i.e. the freebase is a deuterated analogue of DMT. In these embodiments, the deuterium-substituted DMT compound is any one of α-monodeutero-N,N-dimethyltryptamine, α,α-dideutero-N,N-dimethyltryptamine, α,β-dideutero-N, N-dimethyltryptamine, α,α,β-trideutero-N, N-dimethyltryptamine, α,β,β-trideutero-N,N-dimethyltryptamine and α,α,β,β-tetradeutero-N,N-dimethyltryptamine.

In some embodiments, $R^{4a}$ is H and and $R^{5a}$ is acetoxy (—OC(O)CH$_3$) or methoxy (—OCH$_3$). In these embodiments, the deuterium-substituted DMT compound includes α,α-dideutero-5-methoxy-N, N-dimethyltryptamine.

In some embodiments, $R^{4a}$ is acetoxy (—OC(O)CH$_3$) or methoxy (—OCH$_3$) and $R^{5a}$ is H. In these embodiments, the deuterium-substituted DMT compound includes 4-acetoxy-α,α-dideutero-N,N-dimethyltryptamine.

Herein, α,α-dideutero-N,N-dimethyltryptamine compounds (such as α,α-dideutero-N,N-dimethyltryptamine or substituted α,α-dideutero-N,N-dimethyltryptamines, for example α,α-dideutero-5-methoxy-N,N-dimethyltryptamine) and α-protio, α-deutero-N,N-dimethyltryptamine compounds (such as α-protio,α-deutero-N,N-dimethyltryptamine or substituted α-protio,α-deutero-N,N- dimethyltryptamines, for example α-protio,α-deutero-5-methoxy-N,N-dimethyltryptamine) are referred to as deuterated (or fully deuterated) N,N-dimethyltryptamine compounds and partially deuterated N,N-dimethyltryptamine compounds respectively. A deuterated (or fully deuterated) N,N-dimethyltryptamine compound thus refers strictly to an N,N-dimethyltryptamine with both protons at the α position substituted with deuterium atoms. The term partially deuterated N,N-dimethyltryptamine compound strictly refers to an N,N-dimethyltryptamine in which one of the two protons at the α position is substituted with a deuterium atom. A deuterated N,N-dimethyltryptamine compound herein is any N,N-dimethyltryptamine substituted with two deuterium atoms at the α position, and a partially deuterated N,N-dimethyltryptamine compound is any N,N-dimethyltryptamine with one hydrogen atom and one deuterium atom at the α position.

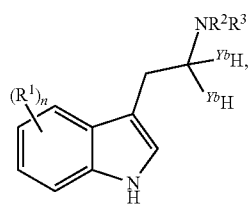

Formula IB wherein:

$R^1$ is independently selected from —$R^{4b}$, —OH, —$OR^{4b}$, —O(CO)$R^{4b}$, monohydrogen phosphate, —F, —Cl, —Br and —I;

n is selected from 0, 1, 2, 3 or 4;

$R^2$ is C($^{xb}$H)$_3$;

$R^3$ is C($^{xb}$H)$_3$ or H;

each $R^{4b}$ is independently selected from $C_1$-$C_4$alkyl; and each $^{xb}$H and each $^{yb}$H is independently protium or deuterium;

wherein a ratio of deuterium:protium in a C($^{xb}$H)$_3$ moiety in the compound is greater than that found naturally in hydrogen.

In some embodiments, the compound is of Formula IB, wherein $R^1$ is independently selected from —$OR^{4b}$, —O(CO)$R^{4b}$, monohydrogen phosphate and —OH.

In some embodiments, the compound is of Formula IB, wherein $R^{4b}$ is methyl.

In some embodiments, the compound is of Formula IB according to any preceding embodiment, wherein n is 1, 2, 3, or 4.

In some embodiments, the compound is of Formula IB according to any preceding embodiment, wherein n is 1.

In some embodiments, the compound is of Formula IB, wherein n is 1, and $R^1$ is at the 4- or 5-position.

In some embodiments, the compound is of Formula IB according to any preceding embodiment, wherein n is 0; or n is 1 and $R^1$ is selected from 5-methoxy, 5-bromo, 4-acetoxy, 4-monohydrogen phosphate, 4-hydroxy and 5-hydroxy.

In some embodiments, the compound is of Formula IB, wherein n is 0.

In some embodiments, the compound is of Formula IB according to any preceding embodiment, wherein both $^{yb}$H are deuterium.

In some embodiments, the compound is of Formula IB according to any preceding embodiment, wherein both $^{yb}$H are protium.

In some embodiments, the compound is of Formula IB according to any preceding embodiment, wherein $R^{2b}$ and $R^{3b}$ are both C($^{xb}$H)$_3$.

In some embodiments, the compound is of Formula IB according to any preceding embodiment, wherein both C($^{xb}$H)$_3$ are the same.

In some embodiments, the compound is of Formula IB according to any preceding embodiment, wherein both $R^{2b}$ and $R^{3b}$ are CD$_3$.

For the avoidance of doubt, the compound N,N-dimethyltryptamine (DMT) may also be known as N,N-dimethyl-1H-indole-3-ethanamine (CAS number 61-50-7).

The compound 5-methoxy-N,N-dimethyltryptamine (5-MeO-DMT) may also be known as 5-methoxy-N,N-dimethyl-1H-indole-3-ethanamine (CAS number 1019-45-0).

The compound 4-acetoxy-N,N-dimethyltryptamine (4-AcO-DMT) may also be known as 4-acetoxy-N,N-Dimethyltryptamine, O-Acetylpsilocin, or Psilacetin.

The compound 4-hydroxy-N,N-Dimethyltryptamine-d$_6$ may also be known as Psilocin-d$_6$ or 3-(2-(bis(methyl-d$_3$)amino)ethyl)-1H-indol-4-ol. The compound N,N-di(trideuteromethyl)tryptamine may also be known as N,N-hexadeuterio-dimethyltryptamine or D6- DMT.

The compound 5-hydroxy-N-mono(trideuteromethyl)tryptamine may also be known as N-methyl-serotonin-D$_3$ (CAS No. 1794811-18-9).

The compound N-mono(trideuteromethyl)tryptamine may also be known as N-methyl-tryptamine-D$_3$ (CAS No. 1794745-39-0)

If desired, formulations may comprise specific amounts of N,N-dimethyltryptamine compounds (for example DMT itself or the $R^4$- or $R^5$-substituted DMTs described herein) and/or partially deuterated N,N-dimethyltryptamine compounds, with the relative proportions of the N,N-dimethyltryptamine against the deuterated N,N-dimethyltryptamine and partially deuterated N,N-dimethyltryptamine compounds controlled by varying the ratio of lithium aluminium hydride and lithium aluminium deuteride in the reducing agent during stage 2 of the synthesis detailed in Scheme 1 below. Relative proportions may further be varied by adding one or more of the N,N-dimethyltryptamine, α,α-dideutero-N,N-dimethyltryptamine and α,α,β,β-tetradeutero-N,N-dimethyltryptamine compounds to the formulations described herein.

Scheme 1: Synthetic pathway for the production of
N,N-dimethyltryptamine compounds

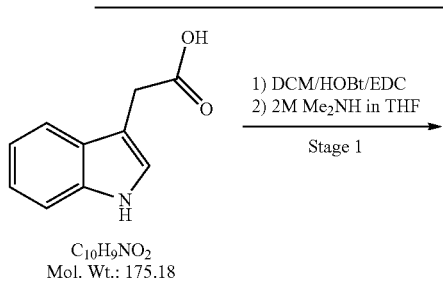

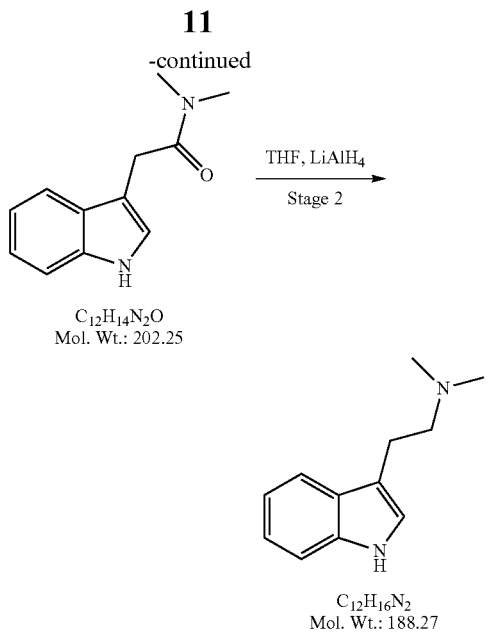

Deuterated or partially deuterated N,N-dimethyltryptamine compounds of Formula IA may be prepared according to the synthetic pathway described in Scheme 1, replacing LiAlH$_4$ with LiAlD$_4$ or with a mixture of LiAlH$_4$ and LiAlD$_4$ to obtain the desired level of deuteration, as described in WO2021/116503 (Small Pharma Ltd). The appropriate substituted indole-3-acetic acid may be utilized as a starting material to obtain the corresponding 4- or 5-substituted deuterated or partially deuterated N,N-dimethyltryptamine compounds.

The compositions described hereinabove may be further modified by adding one or more deuterated or partially deuterated N,N-dimethyltryptamine compounds. Stocks of such deuterated or partially deuterated N,N-dimethyltryptamine compounds may be obtained, for example, by chromatographic separation.

In some embodiments, $R^{4a}$ is acetoxy and $R^{5a}$ is H, i.e. the freebase (the deuterium-substituted DMT) is a deuterated analogue of O-Acetylpsilocin (4-AcO-DMT). In these embodiments, the freebase is any one of 4-acetoxy-α-monodeutero-N,N-dimethyltryptamine, 4-acetoxy-α,α-dideutero-N,N-dimethyltryptamine, 4-acetoxy-α,β-dideutero-N,N-dimethyltryptamine, 4-acetoxy-α,α,β-trideutero-N,N-dimethyltryptamine, 4-acetoxy-α,β,β-trideutero-N,N-dimethyltryptamine, 4-acetoxy-α,β,β-trideutero-N,N-dimethyltryptamine and 4-acetoxy-α,α,β,β-tetradeutero-N,N-dimethyltryptamine.

In particular embodiments, the freebase is 4-acetoxy-α-monodeutero-N,N-dimethyltryptamine or 4-acetoxy-α,α-dideutero-N,N-dimethyltryptamine.

In some embodiments, $R^{4a}$ is H and $R^{5a}$ is methoxy, i.e. the freebase (the deuterium-substituted DMT) is a deuterated analogue of 5-MeO-DMT. In these embodiments, the freebase is any one of 5-methoxy-α-monodeutero-N,N-dimethyltryptamine, 5-methoxy-α,α-dideutero-N,N-dimethyltryptamine, 5-methoxy-α,β-dideutero-N,N-dimethyltryptamine, 5-methoxy-α,β,β-trideutero-N,N-dimethyltryptamine, 5-methoxy-α,β,β-trideutero-N,N-dimethyltryptamine and 5-methoxy-α,α,β,β-tetradeutero-N,N-dimethyltryptamine.

In some embodiments, the freebase is 5-methoxy-α-monodeutero-N,N-dimethyltryptamine or 5-methoxy-α,α-dideutero-N,N-dimethyltryptamine.

Scheme 2 represents alternative schemes known in the art to synthesise DMT compounds of Formula IA, in which substituent $R^1$ denotes hydrogen or the substituent $R^4$ or $R^5$, when other than hydrogen, as defined in Formula IA, and each $R^2$ is methyl.

Scheme 2: Synthetic pathway for the production of optionally substituted N,N-dimethyltryptamine compounds of Formula IA

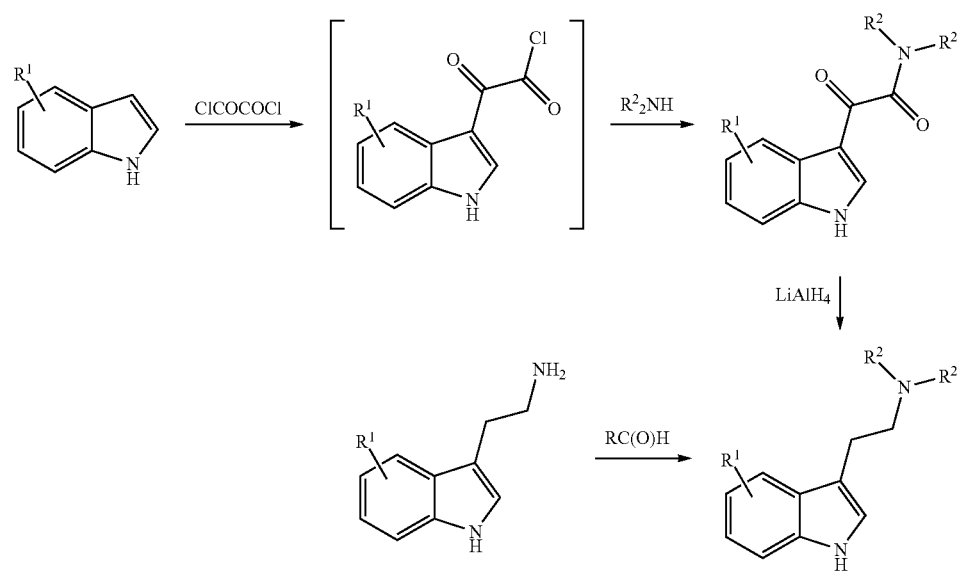

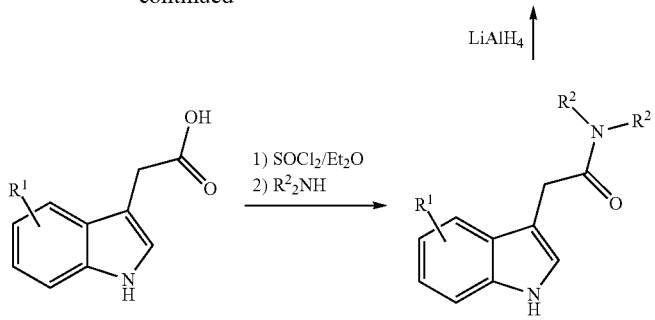

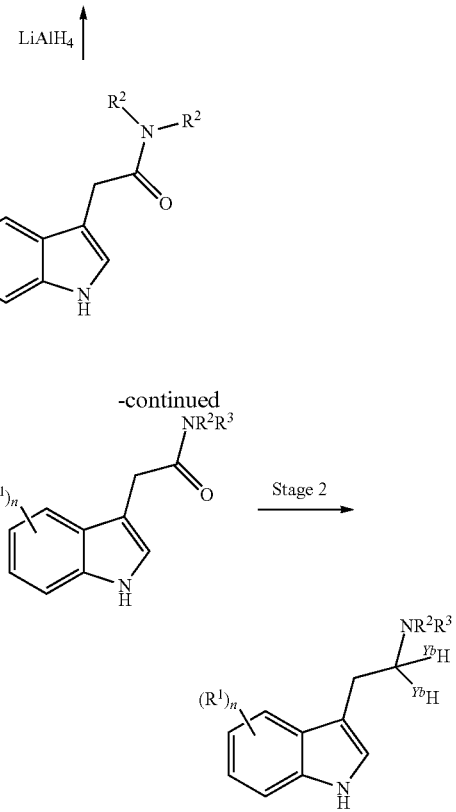

Mixtures of compounds of Formula IA comprising controllable proportions of DMT and DMT with α-mono- and/or α,α-di-deuteration may, if desired, be prepared by reducing 2-(3-indolyl)-N,N-dimethyl acetamide with a desired ratio of lithium aluminium hydride and lithium aluminium deuteride. Similarly, mixtures comprising controllable proportions of DMT and DMT with α-mono-, α,α-di-deuteration, α,β-dideuteration, α,α,β-tri-deuteration, α,β,β-tri-deuteration and α,α,β,β-tetra-deuteration may, if desired, be prepared by reducing 2-(3-indolyl)-N,N-dimethyl-2-oxo-acetamide with a desired ratio of lithium aluminium hydride and lithium aluminium deuteride.

Analogous mixtures of compounds of Formula IA comprising controllable proportions of $R^{4a}$ or $R^{5a}$-substituted DMT and $R^{4a}$ or $R^{5a}$-substituted DMT with α-monodeuteration, α,α-di-deuteration, α,β-dideuteration, α,α,β-trideuteration, α,β,β-tri-deuteration and α,α,β,β-tetra-deuteration may be prepared by reducing $R^{4a}$ or $R^{5a}$-substituted 2-(3-indolyl)-N,N-dimethyl acetamide or $R^{4a}$ or $R^{5a}$-substituted 2-(3-indolyl)-N,N-dimethyl oxoacetamide with a desired ratio of lithium aluminium hydride and lithium aluminium deuteride.

In some cases, protecting groups may be useful. For example, to synthesise DMT substituted with acetyl, a benzyloxy 2-(3-indolyl)-N,N-dimethyl oxoacetamide may be reduced with a desired ratio of lithium aluminium hydride and lithium aluminium deuteride to produce a benzyloxy-N,N-dimethyl tryptamine (optionally substituted at the α and/or β positions with deuterium). The benzyl protecting group may then be removed, e.g. by hydrogenating with hydrogen and palladium on carbon, to form a hydroxy-N,N-dimethyl tryptamine (optionally substituted at the α and/or β positions with deuterium). The hydroxy group may be converted to an acetyl by reaction with acetic anhydride. See D. E. Nichols and S. Frescas, *Synthesis*, 1999, 6, 935-938 for further information on this synthetic strategy.

Scheme 3: Synthetic pathway for the production of N,N-di(trideuteromethyl)tryptamine compounds according to Formula IB

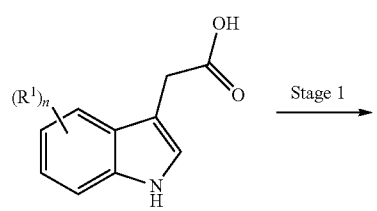

(Stage 1) (1) $CH_2Cl_2$/HOBt/EDC [typically (i) HOBt in $CH_2Cl_2$, (ii) EDC.HCl], (2) 2 M $N(H)R^2R^3$ in THF;

(Stage 2) THF, $LiAlH_4$ and/or $LiAlD_4$, typically quenching with Rochelle's Salts. Scheme 3 depicts the synthesis of compounds of Formula IB.

For more detail on the synthesis of DMT compounds, see the Example section herein.

The synthesis methods detailed in Schemes 1 to 3 may be adapted to produce the compounds of Formula IA and Formula IB by selecting the appropriate starting material, dimethylamine or deuterated analogue, and the suitable amount of $LiAlD_4$ to obtain the desired level of deuteration. Methods by which the compounds of Formula IA and IB may be produced are suitable for the production of high purity compounds of Formula IA and IB. The formulation may comprise a drug substance, which comprises the freebase of a deuterium-substituted dimethyltryptamine at a purity of greater than or equal to 99% when measured by HPLC. In some embodiments, the freebase is of a purity of greater than or equal to 99% by HPLC. Often, the freebase is of a purity of between 99% and 100% by HPLC, such as a purity of between 99.5% and 100% by HPLC. In some embodiments, the freebase, is of a purity of between 99.9% and 100% by HPLC, such as a purity of between 99.95% and 100% by HPLC.

The parenteral (preferably inhalable) formulation comprises a biocompatible excipient. In particular embodiments, the biocompatible excipient comprises a solvent in which the freebase is at least partially soluble. The solvent is typically a liquid at ambient temperature and pressure (about 20° C. and about 1 bar). In more particular embodiments, the solvent is capable of forming a vapour or aerosol comprising the freebase on the application of heat, for example the solvent may be suitable for use in an electronic vaping device (EVD). EVDs typically include a power supply section and a cartridge. The power supply section often comprises a power source such as a battery, and the cartridge often comprises a heater and a reservoir capable of holding an inhalable formulation. The heater is typically contacted with the inhalable formulation (e.g. by a wick), and is typically configured to heat the inhalable formulation to generate a vapour or aerosol.

In some embodiments, the solvent is volatile (has a boiling point of ≤100° C., such as 50 to 100° C.). Such solvents may be capable of evaporation under the airflow of a vaporiser (such as a Volcano Medic Vaporizer) at temperatures of 30 to 70° C., e.g. 55° C. Evaporation of the solvent leaves a residue of freebase, which may then be vapourised into a vapour or aerosol under the airflow of a vaporiser at higher temperatures (e.g. at temperatures of about 150 to 250° C., such as 210° C.), and inhaled.

In some embodiments, the solvent is any one or a combination of two or more selected from the group consisting of propylene glycol (propane-1,2-diol), glycerine, polyethylene glycol, water, propanediol (propane-1,3-diol), butylene glycol (butane-1,3-diol), butane-2,3,-diol, butane-1,2-diol, ethanol and triacetin.

In some embodiments, the solvent is selected from propylene glycol, glycerine and polyethylene glycol, or a mixture thereof. Typically, the solvent is a mixture of propylene glycol and glycerine in a ratio of from about 50:50 (propylene glycol:glycerine) to about 10:90 by weight, such as about 50:50 to about 20:80 or about 50:50 to about 30:70 by weight. In some embodiments, the solvent is a mixture of propylene glycol and glycerine in a ratio of from about to about 30:70 by weight.

Often, the glycerine is vegetable glycerine, i.e. glycerine derived from plant oils.

As described above, the formulations of the invention have uses in the treatment of psychiatric or neurological disorders. The concentration of the freebase within the formulation may be varied depending on the metabolic profile of the patient to whom the formulation is intended to be administered—lower concentrations may be more suitable for a patient with a slower metabolism. The inventors have found that compounds of Formula IA and IB comprising at least one deuterium atom at the αposition are metabolised substantially more slowly than their α-diprotic analogues and consequently exhibit long lasting therapeutic effects. Therefore, the concentration of freebase within the formulation may also be varied depending on the amount of deuterium within the freebase, particularly the amount of deuterium at the alpha and beta positions of the freebase—lower concentrations may be more suitable when using a freebase comprising a greater amount of deuterium. In some embodiments, the concentration of the freebase within the formulation is from about 1 mg/mL to about 1000 mg/mL, such as about 2 mg/mL to about 800 mg/mL or about 5 mg/mL to about 250 mg/mL.

Formulations suitable for inhalation or nasal administration often comprise a taste-masking agent. The purpose of the taste-masking agent is to make the taste or smell of the formulation more appealing to the patient. In some embodiments, the biocompatible excipient comprises a taste-masking agent. When the biocompatible excipient comprises a solvent and a taste-masking agent, the taste-masking agent is typically at least partially soluble in the solvent and the solvent is often able to form a vapour or aerosol comprising the freebase and the taste-masking agent on the application of heat. Often, the taste-masking agent is suitable for vaporisation into a vapour or aerosol under the airflow of a vapouriser (e.g. at temperatures of about 150 to 250° C., such as 210° C.). The taste-masking agent is typically a liquid or a solid at ambient temperature and pressure. It is advantageous that the taste-masking agent has no adverse effect on the bioavailability of the freebase, e.g. it is advantageous that the freebase is stable when stored in the presence of the taste-masking agent.

In some embodiments, the taste-masking agent is any one or a combination of two or more selected from the group consisting of flavourings, glucose, fructose, sorbitol, mannitol, honey, saccharin, sucrose, xylitol, erythritol, maltitol, sucralose, neotame, trehalose and tagatose. In some embodiments, flavourings are menthol, vanilla, wintergreen, peppermint, maple, apricot, peach, raspberry, walnut, butterscotch, wild cherry, chocolate, anise, citrus such as orange or lemon, or liquorice flavourings.

Examples of further biocompatible excipients that may be comprised within the parenteral (preferably inhalable) formulation of the invention include but are not limited to those described in Gennaro et. al., Remmington: *The Science and Practice of Pharmacy*, $20^{th}$ Edition, Lippincott, Williams and Wilkins, 2000 (specifically part 5: pharmaceutical manufacturing). Suitable biocompatible excipients are also described in the Handbook of Pharmaceutical Excipients, $2^{nd}$ Edition; Editors A. Wade and P. J. Weller, American Pharmaceutical Association, Washington, The Pharmaceutical Press, London, 1994. M. F. Powell, T. Nguyen and L. Baloian provide a review of excipients suitable for parenteral administration (preferably administration by inhalation) in PDA J. Pharm. Sci. Technol., 52, 238-311 (1998). All soluble excipients listed in this review article are suitable excipients for use in the formulation.

According to particular embodiments, the formulation of the first aspect comprises two freebases, a first freebase and a second freebase wherein the second freebase is an undeuterated analogue of the first freebase. In some embodiments, the mean molecular weight of the first freebase and second freebase is as defined in Table 1.

TABLE 1

Examples of formulations comprising two or more freebases

| Compound | Substituent | Preferred m/w range of freebases in Daltons |
|---|---|---|
| DMT | — | 188.4-190.3 |
| 4-OAc-DMT | 4-OC(O)CH$_3$ | 246.4-248.3 |
| 5-OAc-DMT | 5-OC(O)CH$_3$ | 246.4-248.3 |
| 5-MeO-DMT | 5-OCH$_3$ | 218.4-220.3 |

In some embodiments, the formulation comprises three freebases, wherein the second freebase is an undeuterated analogue of the first freebase and the third freebase differs from the first freebase and the second freebase only by the number of deuterium atoms. In some embodiments, the mean molecular weight of the freebases is as defined in Table 1.

In some embodiments, the formulation consists essentially of a said first freebase, a said second freebase, optionally a said third freebase and one or more biocompatible excipients.

As used herein, mean molecular weight means the weighted average of molecular weights of the first freebase, second freebase and optional third freebase, as measured by an appropriate mass spectroscopic technique, for example LC-MS SIM (selected-ion monitoring). In some embodiments, the mean molecular weight is the weighted average.

It will be understood that providing compositions with such specific mean molecular weights can be achieved by those skilled in the art through the teachings herein, in particular by adjusting the relative proportions of lithium aluminium hydride and lithium aluminium deuteride in the reductions exemplified.

By reciting that the formulation consists essentially of the first freebase, second freebase, optional third freebase and one or more biocompatible excipients means that the formulation does not comprise material quantities of other pharmaceutically active compounds, including other dimethyltryptamine compounds.

In other words, and alternatively put, the formulations according to these specific embodiments constitute a drug substance comprising a biologically active ingredient consisting essentially of a mixture of the first freebase, second freebase and optional third freebase.

It will be understood that the formulation according to these specific embodiments comprises the first freebase and optional third freebase in amounts greater than found in isotopically unenriched protio analogues. It will also be understood that the greater the proportion of the first freebase and optional third freebase in these specific embodiments, the higher the mean molecular weight of the composition.

In some embodiments, the formulation has an oxygen content of less than 2 ppm, such as between 0.1 ppm and 2 ppm. The skilled person is able to determine the oxygen content of the formulation using any technique known in the art to be suitable, such as using a dissolved oxygen meter (e.g. a Jenway 970 Enterprise Dissolved Oxygen Meter, available from Keison Products: http://www.keison.co.uk/products/jenway/970.pdf.

The formulation may be stored in any suitable container. In some embodiments, to ameliorate degradation of the formulation, the formulation is stored in a container adapted to prevent penetration of ultraviolet light, such as an amber glass vial. In others, the container within which the formulation is stored is not so adapted (and may be, for example, made of clear glass) with protection against ultraviolet light, if desired, provided by secondary packaging (for example packaging within which the receptacle containing the formulation may be placed).

To ameliorate degradation of the formulation, it may be desirable to minimise the total oxygen content within the container in which the formulation is stored, the oxygen within the container equilibrating between the formulation and the headspace (if any) within the container. Accordingly, it may be desirable to store the formulation under an inert atmosphere for example by purging the headspace to reduce its oxygen content from about 20% typically found in air, to less than, for example, 0.5%. Often, the container is airtight and the formulation is stored under an inert atmosphere, such as under nitrogen or argon, typically nitrogen. The formulation may be stored at room temperature, e.g. at about 20 to about 30° C. or at cooler temperatures, for example at about 2 to about 8° C. Alternatively, to ameliorate degradation of the formulation further, it may be stored at temperatures lower than room temperature, such as in a refrigerator or freezer.

By means of pharmaceutically suitable liquids, the formulation can be prepared in the form of a solution, suspension, emulsion, or as a spray. Aqueous suspensions, isotonic saline solutions and sterile injectable solutions may be used, containing pharmaceutically acceptable dispersing agents and/or wetting agents, such as propylene glycol or butylene glycol.

The invention also provides a formulation of the invention, in combination with packaging material suitable for the formulation, the packaging material including instructions for the use of the formulation.

As described above, the invention provides in its second aspect a kit suitable for preparing a parenteral (preferably inhalable) formulation of the first aspect, said kit comprising a freebase of a deuterium-substituted dimethyltryptamine compound, and a biocompatible excipient, which is separate to the freebase.

For the avoidance of doubt, embodiments related to the freebase and the biocompatible excipient of the first aspect of the invention as defined herein apply mutatis mutandis to the second aspect. For example, the freebase may be of Formula IA or IB, as defined above, and/or the biocompatible excipient may comprise a solvent selected from propylene glycol, glycerine and polyethylene glycol, or a mixture thereof.

The freebase within the kit may be a solid, e.g. in a powder or crystalline form. To ameliorate degradation of the freebase in the solid form, the salt may be lyophilised (freeze-dried) before incorporation into the kit. Lyophilising the salt comprises freezing it in the presence of solvent (typically water) and separating the solvent from the salt by sublimation.

In some embodiments, the kit further comprises a container adapted to prevent penetration of ultraviolet light, as described above. In such embodiments, the freebase within the kit is typically contained within the container.

As described above, the invention provides in its third aspect a method of preparing the parenteral (preferably inhalable) formulation of the first aspect, comprising contacting a freebase of a deuterium-substituted dimethyltryptamine compound, with a biocompatible excipient.

For the avoidance of doubt, embodiments related to the freebase and the biocompatible excipient of the first aspect of the invention as defined herein apply *mutatis mutandis* to the third aspect. For example, the freebase may be of Formula IA or IB, as defined above, and/or the biocompatible excipient may comprise a solvent selected from propylene glycol, glycerine and polyethylene glycol, or a mixture thereof.

It will be understood that the contacting of the method may be achieved in a variety of ways. When the biocompatible excipient comprises a solvent, the freebase is often dissolved or suspended in the solvent. When the biocompatible excipient comprises a taste-masking agent, the freebase may be mixed with, dissolved in or suspended in the taste-masking agent. In cases where the biocompatible excipient comprises both a solvent and a taste-masking agent, the freebase and taste-masking agent may be dissolved or suspended in the solvent and may be added to the solvent in any order or simultaneously. Alternatively, the freebase may be mixed with, dissolved in or suspended in the taste-masking agent to form a first composition and the first composition may then be dissolved or suspended in the solvent.

In some embodiments, the method comprises dissolving the freebase in a solvent, such as a solvent selected from propylene glycol, glycerine and polyethylene glycol, or a mixture thereof, to form a solution. Typically, the solvent is a mixture of propylene glycol and glycerine in a ratio of from about 50:50 (propylene glycol:glycerine) to about 10:90 by weight, such as about 50:50 to about 20:80 or about 50:50 to about 30:70 by weight. In some embodiments, the solvent is a mixture of propylene glycol and glycerine in a ratio of from about 50:50 to about 30:70 by weight.

The skilled person is aware of techniques in the art suitable to promote dissolution of a solute such as the freebase into a solvent. Such techniques include agitating or stirring a composition comprising the solute and solvent, application of ultrasound, heating the composition and/or increasing the amount of solvent within the composition. When the method of the third aspect comprises dissolving the freebase in a solvent, the method often comprises stirring the freebase in the solvent, typically at a temperature of from about 25° C. to about 50° C.

Additionally, or alternatively, in embodiments where the method comprises dissolving the freebase in a solvent to form a solution, the method may further comprise sparging the solution resultant from the contacting with an inert gas, such as nitrogen or argon, typically nitrogen.

In some embodiments, the method comprises adding a taste-masking agent. Sometimes, the method comprises dissolving the freebase in a solvent and then adding a taste-masking agent. The same techniques described above as suitable to encourage dissolution of a solute such as a freebase into a solvent also apply to the dissolution of a taste-masking agent into a solvent. Sometimes, the method comprises stirring the freebase and the taste-masking agent in the solvent, typically at a temperature of from about 25° C. to about 50° C.

The freebase within the formulation may be formed by contacting the analogous salt with a quantity of base suitable to deprotonate the conjugate acid (protonated) form of the amine. Accordingly, the method of the invention may comprise contacting a salt of a deuterium-substituted dimethyltryptamine compound, with a base and a biocompatible excipient. Sometimes, the base is any one selected from the group consisting of sodium hydroxide, potassium hydroxide, sodium carbonate, ammonium hydroxide, calcium hydroxide and magnesium hydroxide. In some embodiments, the base is adjusted with sodium hydroxide or potassium hydroxide.

As described above, the invention provides in its fourth aspect a parenteral (preferably inhalable) formulation of the first aspect, or a kit of the second aspect for use in therapy.

For the avoidance of doubt, embodiments related to the parenteral (preferably inhalable) formulation of the first aspect of the invention or the kit of the second aspect of the invention apply mutatis mutandis to the third aspect. For example, the formulation may be suitable for inhalation, the freebase may be a compound of Formula IA or IB, as defined above, the biocompatible excipient may comprise a solvent selected from propylene glycol, glycerine and polyethylene glycol, or a mixture thereof, and/or the concentration of the freebase within the formulation may be from about 1 mg/mL to about 1000 mg/mL.

In some embodiments, the invention provides in its fourth aspect a parenteral (preferably inhalable) formulation of the first aspect for use in therapy.

In some embodiments, the therapy is psychedelic-assisted psychotherapy, i.e. the therapy is treatment of a mental disorder by psychological means, which are enhanced by one or more protocols in which a patient is subjected to a psychedelic experience induced by administration of the formulation.

The invention provides in its fifth aspect a parenteral (preferably inhalable) formulation of the first aspect, or a kit of the second aspect for use in a method of treating a psychiatric or neurological disorder in a patient.

In some embodiments, the invention provides in its fifth aspect a parenteral (preferably inhalable) formulation of the first aspect for use in a method of treating a psychiatric or neurological disorder in a patient.

In another aspect, the invention provides use of a parenteral (preferably inhalable) formulation of the first aspect, or a kit of the second aspect for the manufacture of a medicament. In some embodiments of this aspect, the medicament is for use in a method of treating a psychiatric or neurological disorder in a patient.

In some embodiments, the psychiatric or neurological disorder is selected from (i) an obsessive compulsive disorder, (ii) a depressive disorder, (iii) a schizophrenia disorder, (iv) a schizotypal disorder, (v) an anxiety disorder, (vi) substance abuse, and (vii) an avolition disorder. Often, the psychiatric or neurological disorder is selected from the group consisting of (i) an obsessive compulsive disorder, (ii) a depressive disorder, (iii) an anxiety disorder, (iv) substance abuse, and (v) an avolition disorder.

In some embodiments, the disorder is selected from the group consisting of major depressive disorder, treatment resistant major depressive disorder, post-partum depression, an obsessive compulsive disorder and an eating disorder such as a compulsive eating disorder.

In some embodiments, the psychiatric or neurological disorder is major depressive disorder. In some embodiments, the psychiatric or neurological disorder is treatment resistant depression.

As described above, the deuterium-substituted freebase within the formulation of the invention is metabolised more slowly than its protic analogue and consequently has improved parenteral availability (preferably improved availability following inhalation), allowing for a longer lasting therapeutic effect. Thus, in some embodiments, the therapy or method of treatment comprises parenteral administration (preferably administration by inhalation), such as inhalation or pulmonary administration of the formulation.

Viewed from a sixth aspect, there is provided a method of treating a psychiatric or neurological disorder comprising pulmonary administration to a patient in need thereof of a parenteral (preferably inhalable) formulation of the first aspect.

In some embodiments, the method of treatment is psychedelic-assisted psychotherapy, i.e. the method of treatment is treatment of a mental disorder by psychological means, which are enhanced by one or more protocols in which a patient is subjected to a psychedelic experience induced by administration of the formulation.

For the avoidance of doubt, embodiments related to the method of treatment, of the fifth aspect of the invention apply mutatis mutandis to the sixth aspect. For example, the disorder may be selected from the group consisting of (i) an obsessive compulsive disorder, (ii) a depressive disorder, (iii) an anxiety disorder, (iv) substance abuse, and (v) an avolition disorder.

In order to treat the disorder, an effective amount of the formulation is administered, i.e. an amount that is sufficient to reduce or halt the rate of progression of the disorder, or to ameliorate or cure the disorder and thus produce the desired therapeutic or inhibitory effect.

Each and every reference referred to herein is hereby incorporated by reference in its entirety, as if the entire content of each reference was set forth herein in its entirety.

The invention may be further understood with reference to the examples that follow.

EXAMPLES

DMT, freebase was prepared using the chemistry depicted in Scheme 4. 5-MeO-DMT, freebase was prepared using the same procedure, but in which the indole-3-acetic acid starting material is replaced with 5-methoxyindole-3-acetic acid. An additional 4-6 g of six partially deuterated versions of DMT were also produced using modified conditions.

Scheme 4: Synthetic route used to prepare SPL026

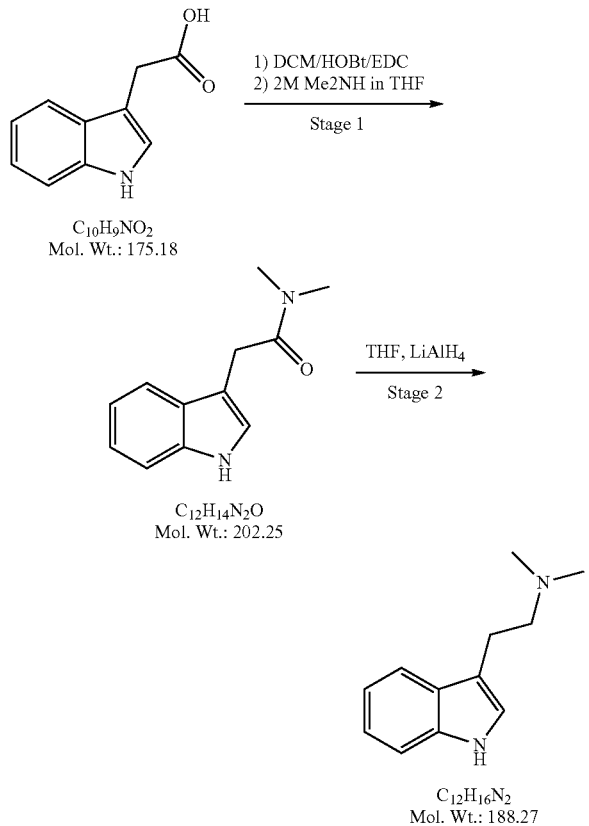

Dimethyltryptamine (SPL026, DMT)
Stage 1: Coupling of indole-3-acetic acid and dimethylamine To a 5 L vessel under $N_2$ was charged indole-3-acetic acid (257.0 g, 1.467 mol), Hydroxybenzotriazole (HOBt) (~20% wet) (297.3 g, 1.760 mol) and dichloromethane (DCM) (2313 mL) to give a milky white suspension. Ethylcarbodiimide hydrochloride (EDC.HCl) (337.5 g, 1.760 mol) was then charged portion-wise over 5 minutes at 16-22° C. The reaction mixture was stirred for 2 hours at ambient temperature before 2 M dimethylamine in tetrahydrofuran (THF) (1100 mL, 2.200 mol) was charged dropwise over 20 minutes at 20-30° C. The resultant solution was stirred at ambient temperature for 1 hour where HPLC indicated 1.1% indole-3-acetic acid and 98.1% stage 1. The reaction mixture was then charged with 10% $K_2CO_3$ (1285 mL) and stirred for 5 minutes. The layers were separated, and the upper aqueous layer extracted with DCM (643 mL×2). The organic extracts were combined and washed with saturated brine (643 mL). The organic extracts were then dried over $MgSO_4$, filtered and concentrated in vacuo at 45° C. This provided 303.1 g of crude stage 1 as an off-white sticky solid. The crude material was then subjected to a slurry in methyl-t-butyl ether (TBME) (2570 mL) at 50° C. for 2 hours before being cooled to ambient temperature, filtered and washed with TBME (514 mL×2). The filter-cake was then dried in vacuo at 50° C. to afford stage 1 266.2 g (yield=90%) as an off-white solid in a purity of 98.5% by HPLC and >95% by NMR.

Stage 2: Preparation of DMT

To a 5 L vessel under $N_2$ was charged stage 1 (272.5 g, 1.347 mol) and THF (1363 mL) to give an off-white suspension. 2.4 M $LiAlH_4$ in THF (505.3 mL, 1.213 mol) was then charged dropwise over 35 minutes at 20-56° C. to give an amber solution. The solution was heated to 60° C. for 2 hours where HPLC indicated stage 1 ND, stage 2 92.5%, Impurity 1 2.6%, Impurity 2 1.9%. The complete reaction mixture was cooled to ambient temperature and then charged to a solution of 25% Rochelle's salts (aq.) (2725 mL) dropwise over 30 minutes at 20-30° C. The resultant milky white suspension was allowed to stir at 20-25° C. for 1 hour after which the layers were separated and the upper organic layer washed with saturated brine (681 mL). The organic layer was then dried over $MgSO_4$, filtered and concentrated in vacuo at 45° C. The resultant crude oil was subjected to an azeotrope from ethanol (545 mL×2). This provided 234.6 g (yield=92%) of stage 2 in a purity of 95.0% by HPLC and >95% by NMR.

5-Methoxy-Dimethyltrryptamine (SPL029, 5-MeO-DMT)
Stage 1: Coupling of 5-methoxyindole-3-acetic acid and dimethylamine To a 100 mL 3-neck flask under $N_2$ was charged 5-methoxyindole-3-acetic acid (3.978 g, 19.385 mmol), HOBt (~20% wet) (3.927 g, 23.261 mmol) and DCM (40 mL). EDC.HCl (4.459 g, 23.261 mmol) was then charged in portions over 15 minutes at <30° C. The reaction mixture was stirred at ambient temperature for 1 hour before being charged with 2 M dimethylamine (14.54 mL, 29.078 mmol) dropwise over 15 minutes at <25° C. After stirring for 1 hour HPLC indicated no starting material (SM, i.e. 5-methoxy-indole-3-acetic acid) remained. The reaction mixture was then charged with 10% $K_2CO_3$ (20 mL), stirred for 5 minutes then allowed to separate. The lower aqueous layer was removed and back extracted with DCM (10 mL×2). The organic extracts were combined, washed with saturated brine (10 mL) then dried over $MgSO_4$ and filtered. The filtrate was concentrated in vacuo at 45° C. to provide 3.898 g active (yield=87%) of product in a purity of 95.7% by HPLC.

Stage 2: Preparation of 5-MeO-DMT

To a 100 mL 3-neck flask under $N_2$ was charged stage 1 methoxy derivative (3.85 g, 16.586 mmol) and THF (19.25 mL). 2.4 M $LiAlH_4$ in THF (6.22 mL, 14.927 mmol) was then charged dropwise over 30 minutes at <40° C. The reaction mixture was heated to 60° C. for 1 hour where HPLC indicated 0.1% SM (stage 1 methoxy derivative) remained. The reaction mixture was then cooled to ambient temperature and quenched into 25% Rochelle's salts (38.5 mL) dropwise over 30 minutes at <30 ° C. The resultant suspension was stirred for 1 hour before being allowed to separate. The lower aqueous layer was then removed, and the upper organic layer washed with saturated brine (9.6 mL). The organics were then dried over $MgSO_4$, filtered and concentrated in vacuo before being subjected to an azeotrope from EtOH (10 mL×2). This provided 3.167 g active (yield=88%) of product in a purity of 91.5% by HPLC.

Example 1:
α,α-Dideutero-5-Methoxy-Dimethyltryptamine
($d_2$-5-MeO-DMT)

For stage 1 (coupling of 5-methoxyindole-3-acetic acid and dimethylamine), see stage 1 of the preparation of 5-MeO-DMT above.

Stage 2: Preparation of α,α-Dideutero-5-Methoxy-Dimethyltryptamine

To a 100 mL 3-neck flask under $N_2$ was charged stage 1 methoxy derivative (3.85 g, 16.586 mmol) and THF (19.25 mL). 2.4 M $LiAlD_4$ in THF (6.22 mL, 14.927 mmol) was then charged dropwise over 30 minutes at <40° C. The reaction mixture was heated to 60° C. for 1 hour where HPLC indicated 0.1% SM (stage 1 methoxy derivative) remained. The reaction mixture was then cooled to ambient temperature and quenched into 25% Rochelle's salts (38.5 mL) dropwise over 30 minutes at <30° C. The resultant suspension was stirred for 1 hour before being allowed to separate. The lower aqueous layer was then removed, and the upper organic layer washed with saturated brine (9.6 mL). The organics were then dried over $MgSO_4$, filtered and concentrated in vacuo before being subjected to an azeotrope from EtOH (10 mL×2). This provided 3.196 g active (yield=88%) of product in a purity of 91.5% by HPLC.

Example 2: Synthesis of Deuterated Mixtures of DMT Compounds

A modified synthesis at stage 2 using solid $LiAlH_4$/$LiAlD_4$ mixtures was adopted, using 1.8 equivalents of $LiAlH_4$/$LiAlD_4$ versus 0.9 equivalents using the process described above for undeuterated DMT.

Six deuteration reactions were performed.
Representative Synthesis of a Deuterated Mixture (Using 1:1 $LiAlH_4$: $LiAlD_4$) of DMT Compounds To a 250 mL 3-neck flask under $N_2$ was charged $LiAlH_4$ (1.013 g, 26.7 mmol), $LiAlD_4$ (1.120 g, 26.7 mmol) and THF (100 mL). The resultant suspension was stirred for 30 minutes before stage 1 (6 g, 29.666 mmol) was charged portion-wise over 15 minutes at 20-40° C. The reaction mixture was then heated to reflux (66° C.) for 2 hours where HPLC indicated no stage 1 remained. The mixture was cooled to 0° C. and quenched with 25% Rochelle's salts (aq) (120 mL) over 30 minutes at <30° C. The resultant milky suspension was stirred for 1 hour and then allowed to separate. The lower aqueous layer was removed and the upper organic layer washed with saturated brine (30 mL). The organics were then dried over $MgSO_4$, filtered and concentrated in vacuo. This provided 4.3 g of crude material. The crude was then taken up in ethanol (52 mL) and charged with fumaric acid (2.66 g, 22.917 mmol) before heating to 75° C. The resultant solution was allowed to cool to ambient temperature overnight before further cooling to 0-5° C. for 1 hour. The solids were isolated by filtration and washed with cold ethanol (6.5 mL×2). The filtercake was dried at 50° C. overnight to provided 5.7 g (yield=63%) of product in a purity of 99.9% by HPLC and >95% by NMR.

Assessment of Extents of Deuteration

This was achieved by LCMS-SIM (SIM=single ion monitoring), the analysis giving a separate ion count for each mass for the three deuterated N,N-dimethyltryptamine compounds (N,N-dimethyltryptamine (D0), α-deutero-N,N-dimethyltryptamine (D1) and α,α-dideutero-N,N-dimethyltryptamine (D2)) at the retention time for N,N-dimethyltryptamine. The percentage of each component was then calculated from these ion counts.

For example, % D0=[D0/(D0+D1+D2)]×100.

HPLC Parameters

| System: | Agilent 1100/1200 series liquid chromatograph or equivalent |
|---|---|
| Column: | Triart Phenyl; 150 × 4.6 mm, 3.0 μm particle size (Ex: YMC, Part number: TPH12S03-1546PTH) |
| Mobile phase A: | Water:Trifluoroacetic acid (100:0.05%) |
| Mobile phase B: | Acetonitrile:Trifluoroacetic acid (100:0.05%) |

| Gradient: | Time | % A | % B |
|---|---|---|---|
| | 0 | 95 | 5 |
| | 13 | 62 | 38 |
| | 26 | 5 | 95 |
| | 30.5 | 5 | 95 |
| | 31 | 95 | 5 |

| Flow rate: | 1.0 mL/min | | |
|---|---|---|---|
| Stop time: | 31 minutes | Post runtime: | 4 minutes |
| Injection volume: | 5 μL | Wash vial: | N/A |
| Column temperature: | 30° C. combined | | |
| Wavelength: | 200 nm, (4 nm) | Reference: | N/A |

Mass Spectrometry Parameters

| System: | Agilent 6100 series Quadrupole LC-MS or equivalent | | |
|---|---|---|---|
| Drying gas flow: | 12.0 L/min | Drying gas temp.: | 350° C. |
| Nebuliser pressure: | 35 psig | | |
| Fragmentor: | 110 | Gain: | 1.00 |

| Cpd | RT | RRT | Conc | Diluent | Detection | Mass |
|---|---|---|---|---|---|---|
| D0 | 10.64 | 1.00 | 0.30 mg/ml | $CH_3CN:H_2O$ (50:50) | (+) SIM | 189.10 m/z |
| D1 | 10.64 | 1.00 | 0.30 mg/ml | $CH_3CN:H_2O$ (50:50) | (+) SIM | 190.10 m/z |
| D2 | 10.64 | 1.00 | 0.30 mg/ml | $CH_3CN:H_2O$ (50:50) | (+) SIM | 191.10 m/z |

MS-SIM range is the target mass ±0.1 m/z

The data for the six deuterated reactions are tabulated in Table 2 below:

| Mixture No. ($LiAlH_4$:$LiAlD_4$ ratio) | Input (stage 1) | Output stage 3 (yield) | Purity by HPLC | Purity by NMR | Deuteration % | | |
|---|---|---|---|---|---|---|---|
| | | | | | $D_0$ | $D_1$ | $D_2$ |
| 1 (0:1) | 5 g | 5.3 g (65%) | 99.7% | >95% | 0.7% | 2.7% | 96.6% |

| Mixture No. (LiAlH₄:LiAlD₄ ratio) | Input (stage 1) | Output stage 3 (yield) | Purity by HPLC | Purity by NMR | Deuteration % | | |
|---|---|---|---|---|---|---|---|
| | | | | | $D_0$ | $D_1$ | $D_2$ |
| 2 (1:1) | 6 g | 5.699 g (63%) | 99.9% | >95% | 30.0% | 48.3% | 21.7% |
| 3 (1:2) | 5 g | 4.206 g (52%) | 99.9% | >95% | 16.5% | 46.8% | 36.8% |
| 4 (1:3) | 5 g | 5.558 g (68%) | 99.8% | >95% | 9.3% | 41.5% | 49.2% |
| 5 (2:1) | 5 g | 4.218 g (52%) | 99.9% | >95% | 47.5% | 41.3% | 11.2% |
| 6 (3:1) | 5 g | 5.0 g (62%) | 99.4% | >95% | 57.5% | 35.3% | 7.4% |

Example 3: N,N-Hexadeuterio-Dimethyltryptamine ($d_6$-DMT, SPL028vii)

Stage 1

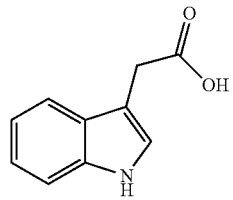

Molecular Weight: 175.18

Stage 2

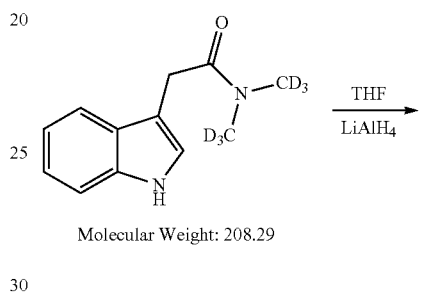

Molecular Weight: 208.29

Molecular Weight: 208.29

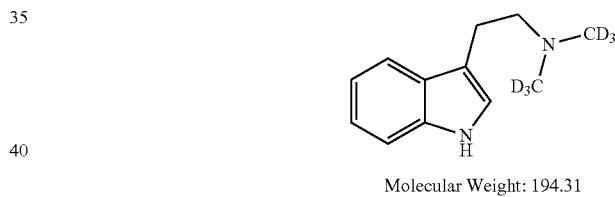

Molecular Weight: 194.31

EDC.HCl (15.7 g, 81.90 mmol) was added to 3-indoleacetic acid (12.0 g, 68.50 mmol) and HOBt.H₂O (1.16 g, 75.75 mmol) in DCM (108 mL) at room temperature. The reaction was stirred for 1 hour after which N,N-diisopropylethylamine (DIPEA) (35.6 mL, 205.75 mmol) and $d_6$-dimethylamine.HCl (9.0 g, 102.76 mmol) were added (temperature maintained below 30° C.). The reaction was stirred for 1 hour at room temperature after which analysis by HPLC indicated 65.6% product with 28.9% 3-indoleacetic acid remaining. DIPEA (11.9 mL, 68.78 mmol) was added and the reaction was stirred for 1 hour at room temperature. HPLC indicated no change in conversion. Aqueous potassium carbonate (6.0 g in 54 mL water) was added and the phases were separated. The aqueous phase was extracted with DCM (2×30 mL). The combined organics were washed with brine (2×30 mL) then aqueous citric acid (20 w/w %, 50 mL), dried over MgSO₄ and filtered. The filtrate was stripped and the resulting solids were slurried in TBME (120 mL) and isolated by filtration. Purification by flash column chromatography yielded 8.34 g of the desired product (58% yield). ¹H NMR confirmed the identity of the product.

LiAlH₄ (1 M in THF, 17.3 mL, 17.28 mmol) was added to a suspension of stage 1 (4.0 g, 19.20 mmol) in THF (10 mL) at <30° C. The resulting reaction was heated to 60-65° C. and stirred for 2 hours. HPLC analysis indicated complete consumption of stage 1 with 97.3% product formed. The reaction was cooled to room temperature and quenched into aqueous Rochelle's salts (10 g in 30 mL water) at <30° C. After stirring for 1 hour, the phases were separated. The aqueous phase was extracted with THF (20 mL). The combined organics were washed with brine (20 mL), dried over MgSO₄, filtered and stripped (azeotroped with ethanol, mL) to give the desired product as an amber oil (3.97 g). ¹H NMR confirmed the identity of the product and indicated 8.5% ethanol was present (no THF) giving an active yield of 3.63 g, 97%.

Example 4: α,α-Bis-Deuterio-N,N-Hexadeuterio-Dimethyltryptamine ($d_8$-DMT, SPL028viii)

Stage 1 (coupling of 3-indoleacetic acid and $d_6$-dimethylamine), was carried out according to the process described for Example 3, Stage 1 above.

Stage 2

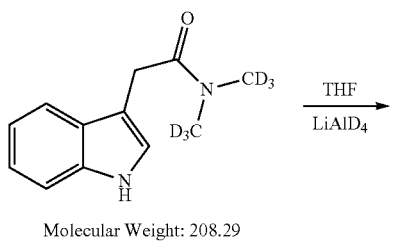

Molecular Weight: 208.29

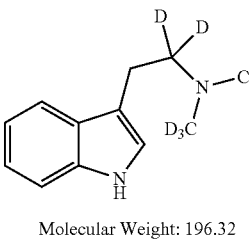

Molecular Weight: 196.32

LiAlD$_4$ (1 M in THF, 17.3 mL, 17.28 mmol) was added to a suspension of stage 1 (4.0 g, 19.20 mmol) in THF (10 mL) at <30° C. The resulting reaction was heated to 60-65° C. and stirred for 2 hours. HPLC analysis indicated complete consumption of the stage 1 with 97.3% product formed. The reaction was cooled to room temperature and quenched into aqueous Rochelle's salts (10 g in 30 mL water) at <30° C. After stirring for 1 hour, the phases were separated. The aqueous phase was extracted with THF (20 mL). The combined organics were washed with brine (20 mL), dried over MgSO$_4$, filtered and stripped (azeotroped with ethanol, mL) to give the desired product as an amber oil (4.01 g). $^1$H NMR confirmed the identity of the product and indicated 8.6% ethanol was present (no THF) giving an active yield of 3.66 g, 97%.

Example 5:
5-Methoxy-N,N-Hexadeuterio-Dimethyltryptamine (d$_6$-5-MeO-DMT)

Stage 1

The coupling of 5-methoxy-3-indoleacetic acid and d$_6$-dimethylamine was carried out on a 20 g scale by a process analogous to that described for Stage 1 of Example 3 hereinabove. Purification by flash column chromatography yielded (87%) of a light brown solid, with 97.8% purity by HPLC. Molecular weight: 238.32.

Stage 2
The product of Example 5, Stage 1 was reacted with LiAlH$_4$ in THF according to the process described for Stage 2 of Example 3. The reaction was carried out on a 9 g scale to produce d$_6$-5-MeO-DMT as an amber oil with a yield of 8.22 g (7.40 g active, 87.3%) and 98.4% purity by HPLC. Molecular weight: 224.34.

Example 6: 5-Methoxy-α,α,-Bis-Deuterio-N,N-Hexadeuterio-Dimethyltryptamine (d$_8$-5-MeO-DMT)

Stage 1
The coupling of 5-methoxy-3-indoleacetic acid and d$_6$-dimethylamine was carried out on a 20 g scale by a process analogous to that described for Stage 1 of Example 3 hereinabove. Purification by flash column chromatography yielded (87%) of a light brown solid, with 97.8% purity by HPLC. Molecular weight: 238.32.

Stage 2
The product of Example 6, Stage 1 was reacted with LiAlD$_4$ in THF on a 9 g scale according to the process described for Stage 2 of Example 4. Purification yielded 8.12 g (7.58 g active, 88.7%) of the product d$_8$-5-MeO-DMT as an amber oil, with 97.9% purity by HPLC. Molecular weight: 226.35

Extent of Deuteration

| Compound | Molecular Weight | D0 | D4 | D5 | D6 | D7 | D8 |
|---|---|---|---|---|---|---|---|
| D$_6$- DMT (Example 3; SPL028vii) | 194.31 | N/D | LT 0.01% | 1.2% | 98.8% | | |
| D$_8$- DMT (Example 4; SPL028viii) | 196.32 | N/D | | | 0.1% | 3.2% | 96.7% |
| D$_6$-MeO-DMT (Example 5) | 224.34 | N/D | | | 0.4% | 99.6% | |
| D$_8$-MeO-DMT (Example 6) | 226.35 | N/D | | | 3.9% | 3.2% | 92.8% |

D$_6$-5-Hydroxy-Dimethyltryptamine and d$_8$-5-Hydroxy-Dimethyltryptamine (5-hydroxy-N,N-hexadeuterio-dimethyltryptamine and α,α,-bis-deuterio-5-hydroxy-N,N-hexadeuterio-dimethyltryptamine) may be prepared by a process analogous to that described for Examples 5 and 6 respectively, using 5-hydroxy-3-indoleacetic acid as a starting material.

4-Acetoxy d$_6$ and d$_8$ deuterated compounds may also be prepared by an analogous process, using 4-acetoxy-3-indoleacetic acid as a starting material.

In Vitro Intrinsic Clearance of Undeuterated DMT (SPL026) and 6 Deuterated Compound Blends In vitro determination of intrinsic clearance is a valuable model for predicting in vivo hepatic clearance. The liver is the main organ of drug metabolism in the body, containing both phase I and phase II drug metabolising enzymes, which are present in the intact cell.

Aim
To use human hepatocytes to assess the in vitro intrinsic clearance of deuterated DMT analogue blends relative to DMT.

Description of the experiment
Human (mixed gender) hepatocytes pooled from 10 donors (0.545 million cells/mL) were used to investigate the in vitro intrinsic clearance of DMT and 6 deuterated analogues.

A concentration of 5 μM was used for all test compounds, as well as sumatriptan, serotonin, benzylamine controls. This concentration was chosen in order to maximise the signal-to-noise ratio, while remaining under the Michaelis constant (Km) for the monoamine oxidase enzyme (MAO). Diltiazem and diclofenac controls were used at a laboratory-validated concentration of 1 µM.

Test compounds were mixed with the hepatocyte suspension within a 96-well plate and incubated for up to 60 minutes at 37° C. The suspension was continuously agitated. At 7 time points, small aliquots were withdrawn, and the test compound/blend concentration therein was measured by LC-MS/MS. The time points measured were 2, 4, 8, 15, 30, 45 and 60 minutes.

The following LC-MS/MS conditions were used for the analysis:
Instrument: Thermo TSQ Quantiva with Thermo Vanquish UPLC system
Column: Luna Omega 2.1×50 mm 2.6 µm
Solvent A: $H_2O$+0.1% formic acid
Solvent B: Acetonitrile+0.1% formic acid
Flow rate: 0.8 ml/min
Injection vol: 1 µl
Column temp: 65° C.
Gradient:

| Time (mins) | % Solvent B |
| --- | --- |
| 0.00 | 5.0 |
| 0.90 | 75.0 |
| 1.36 | 99.0 |
| 1.36 | 5.0 |
| 1.80 | 5.0 |

MS parameters:
Positive ion spray voltage: 4000 V
Vaporiser temperature: 450° C.
Ion transfer tube temp: 365° C.
Sheath gas: 54
Aux gas: 17
Sweep gas: 1
Dwell time 8 ms
MRM transitions:
D0=mass to charge ratio 189.14>58.16.
D1=mass to charge ratio 190.14>59.17.
D2=mass to charge ratio 191.14>60.17.

The MRM transitions were determined from a preliminary analysis of DMT samples containing either no deuterium (for D0 transition), or high levels of either D1 or D2 deuteration (for the D1 and D2 transitions respectively).

The resulting concentration-time profile was then used to calculate intrinsic clearance (CLint) and half-life (t½). To do this, the MS peak area or MS peak area/IS response of each analyte is plotted on a natural log scale on the y axis versus time (min) of sampling on the X axis. The slope of this line is the elimination rate constant. This is converted to a half-life by -ln(2)/slope. Intrinsic clearance is calculated from the slope/elimination rate constant and the formula is CLint=(-1000*slope)/cell density in 1E6 cells/ml, to give units of microlitre/min/million cells.

Results

Intrinsic clearance and half-life values were calculated for DMT and the 6 deuterated mixtures detailed in Table 3. These data were weighted dependent on the ratio of D0, D1 and D2 to give an overall intrinsic clearance and half-life value for each compound blend (Table 3).

TABLE 3

In vitro intrinsic clearance and calculated half-life of DMT and 6 deuterated mixtures

| Compound name or Mixture No (per Table 2) | $LiAlH_4$:$LiAlD_4$ input ratio | $D_0$:$D_1$:$D_2$ output ratio | Half-life (min) |
| --- | --- | --- | --- |
| DMT (SPL026) | 1:0 | 100:0:0 | 92.39 |
| 1 | 0:1 | 0.7:2.7:96.6 | 178.79 |
| 2 | 1:1 | 30.0:48.3:21.7 | 125.80 |
| 3 | 1:2 | 16.5:46.8:36.8 | 140.43 |
| 4 | 1:3 | 9.3:41.5:49.2 | 116.84 |
| 5 | 2:1 | 47.5:41.3:11.2 | 119.61 |
| 6 | 3:1 | 57.4:35.3:7.4 | 95.04 |

Data were fitted with a linear model using regression analysis, which revealed that deuterium enrichment at the α-carbon of DMT decreases intrinsic clearance linearly with increasing molecular weight (MW), therefore enabling manufacture of DMT drug substances with half-lives which can be accurately predicted in the range identified.

Figure 2:
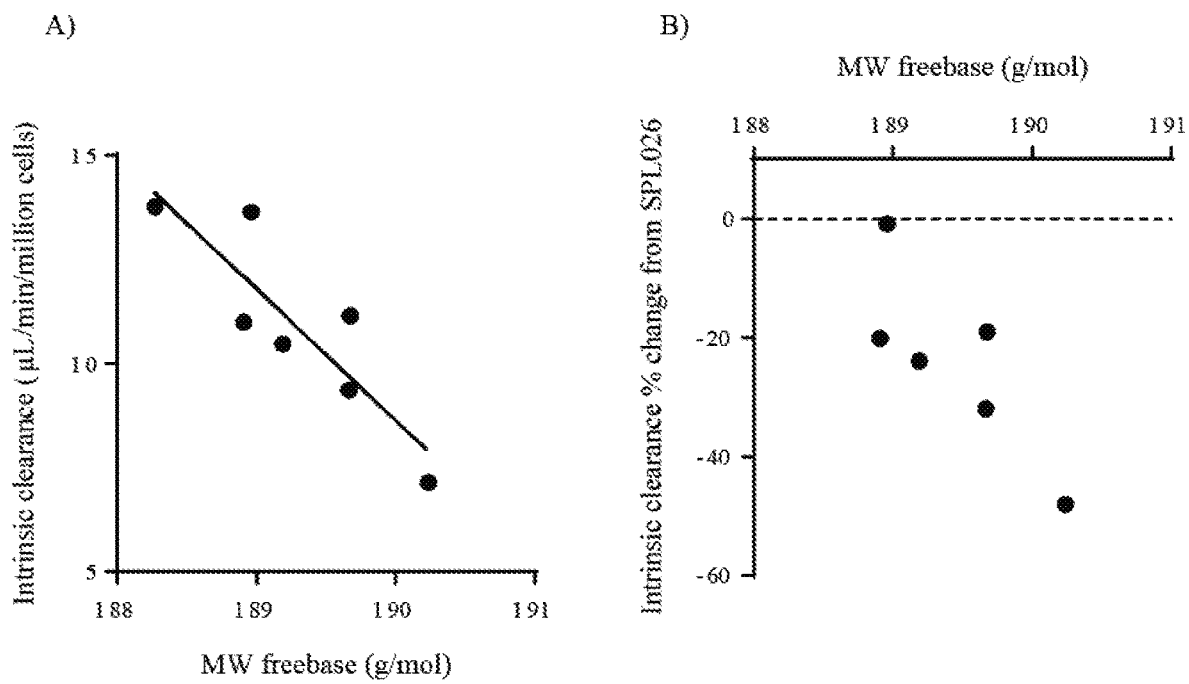
FIG. 2: in vitro intrinsic clearance for DMT and 6 deuterium-containing compositions described in the Examples section, below. A) Linear regression analysis. The $r^2$ value for intrinsic clearance is 0.7648; where the slope was found to be significantly different to zero, p=0.01. B) Intrinsic clearance of deuterated analogues as a percent change from (undeuterated) DMT (dashed line).

Mixture 1, which contains 96.6% D2-DMT, sees the biggest change, with the intrinsic clearance rate almost halved compared to undeuterated-DMT (FIG. 2), nearly doubling the half-life (FIG. 1). Intermediate blends of deuteration (Mixtures 2 to 5) decreased intrinsic clearance in a manner correlated with molecular weight (FIG. 2).

Conclusion

These data demonstrate that increasing deuterium enrichment at the α-carbon of DMT increases metabolic stability, leading to a decrease in clearance and longer half-life. A linear relationship exists between MW and half-life, in particular when the input reducing agent for production of the deuterium enriched DMT-containing drug substance by methods of the present invention comprise $LiAlH_4$ and $LiAlD_4$ with ratio between 1:2.5 and 2.5:1. The relative half-life of analogous mixtures of protio, mono- and di-deutero compounds of substituted DMT such as compounds of Formula IA and IB are expected to mirror the trends observed here for mixtures of protio, mono- and di-deutero DMT. It is expected that increasing deuterium enrichment at the α-carbon of compounds of formula IA and IB increases metabolic stability, leading to a decrease in clearance and longer half-life.

Clearance of $D_6$-DMT (SPL028vii) and $D_8$-DMT (SPL028viii)

Further human hepatocyte assays were conducted with $D_6$-DMT and $D_8$-DMT to measure in vitro intrinsic clearance using human (mixed gender) hepatocytes from 10 donors (0.362 million cells/mL).

| Compound Name | Intrinsic Clearance (µL/min/million cells) | Fold change from SPL026 | Half-life (min) | Fold change from SPL026 |
| --- | --- | --- | --- | --- |
| SPL026 | 19.4 | 1.0 | 98.9 | 1.0 |
| SPL028vii | 17.1 | 1.1 | 112.1 | 1.1 |
| SPL028viii | 9.3 | 2.1 | 206.9 | 2.1 |
| Diltiazem | 22.0 | | 87.3 | |
| Diclofenac | 92.5 | | 20.7 | |

In vitro intrinsic clearance and half-life of $D_6$-deuterated DMT and $D_8$-deuterated DMT analogue blends in human hepatocytes.

Intrinsic clearance of SPL026 (19.4 µL/min/million cells)—Intrinsic clearance of SPL028vii (17.1 µL/min/million cells)=2.3 μL/min/million cells. Intrinsic clearance of SPL028vii showed a 1.1 fold change from DMT (SPL026).

Intrinsic clearance of D 8 -deuterated DMT (SPL028viii) showed a 2.1 fold change from DMT (SPL026).

Inhalable Formulations of Deuterium-Enriched DMT and Deuterium Enriched 5-Methoxy-DMT Compounds Step 1: 1 g of either deuterium-enriched DMT freebase or deuterium-enriched 5-methoxy-DMT freebase is placed in a volumetric flask and dissolved in warm 100% ethanol to a concentration of 100 mg/ml.

Step 2: The resulting inhalable formulation may be varied in concentration to achieve a target dosage in the typical range of 1 mg to 25 mg of the deuterated compound in 200 μl which is the dose volume delivered by a Volcano Medic Vaporizer. In accordance with the invention, for example, a 10 mg inhalable dose of of the deuterated compound is delivered by diluting the stock solution 1:1 with 100% ethanol , providing 50 mg of the deuterated compound dissolved in 100% ethanol for a final solution volume of 1 ml. Aliquots of the stock solution are stored in vials until further use.

Step 3: 200 ul of the 50 mg/ml solution is transferred to a dosing capsule containing a drip pad (Storz & Bickel, Germany).

Step 4: The deuterated compound charged dosing capsule is transferred to the filling chamber of a preheated Volcano Medic Vaporizer (55° C.). The airflow of the vaporizer is switched on for 60 seconds at a pre-set rate of 12 l/min to evaporate the ethanol solvent. The mg dose of deuterated compound is confirmed by subtracting the weight of the dosing capsule plus residue from the empty weight of the dosing capsule.

Step 5: The prepared dosing capsule is returned to the filling chamber of the Volcano Medic Vaporizer, now preheated to 210° C., with the airflow on for at least 5 minutes immediately prior to transfer. An inhalation balloon with valve attached (Storz & Bickel, Germany) is mounted on the socket of the filling chamber. Once closed and sealed, the airflow is switched on for 15 seconds at a flow rate of 12 l/min, allowing the full dose of deuterated compound to aerosolize within the balloon in a volume of about 3 litres.

Step 6: The balloon is disconnected from the filling chamber, automatically closing the valve. The aerosolized dose of deuterated compound can then be administered to a patient via the balloon.

Step 7: To prepare for the administration, a patient is advised to perform several deep inhalations and exhalations, in order to empty the lungs. Then, with the mouthpiece firmly held against the lips, the full and complete volume of the inhalation balloon is inhaled in one inhalation, holding the breath for about 10 seconds, followed by a normal exhalation. Repeated inhalations into and out of the balloon can aid in maximum absorption of the deuterated compound dose by the patient.

Alternative Inhalable Formulations of Deuterium-Enriched DMT and Deuterium Enriched Compounds An alternative way to prepare inhalable formulations in accordance with the invention is to prepare a liquid solution of either deuterium-enriched DMT freebase or deuterium-enriched 5-methoxy-DMT freebase which is compatible with an electric vaporizer, e.g. A SMOK AL85 or Alike 40W (available on Amazon). Generally, any electric vaporizer with output current of 20 Amps or more will be compatible with the formulations described in this example.

Step 1: To a 4 ml glass vial which is compatible with an electric vaporizer (e.g. A sub ohm tank), add 3 ml of vegetable glycerine (or any premixed combination of propylene glycol and vegetable glycerine, also known as 'vape juice'), and then add 0.75 g of the deuterium-enriched compound freebase. The deuterium-enriched compound will dissolve when left for a few hours, and will dissolve more quickly with gentle heating in a water bath. If any material remains undissolved, extract the solution with a syringe fitted with a filter and transfer the filtrate to a clean vial.

Step 2: Attach and secure the vial to the vaporizer and switch on the power. The patient then uses the vaporiser according to the instructions provided. When this method is used, the patient can self-titrate to an effective dose, usually under the guidance of a guide or a healthcare professional. Advantages of this invention over DMT vapes known in the art include a reduction of the number and frequency of inhalations necessary to achieve a particular psychedelic experience. Moreover, the extended half-life provides for an extended and/or tailored duration of experience.

The invention claimed is:

1. A parenteral formulation suitable for inhalation comprising a freebase of a deuterium-substituted dimethyltryptamine compound of Formula IA or of Formula IB:

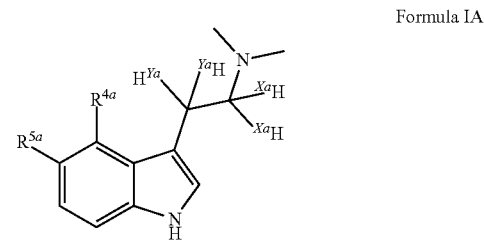

Formula IA wherein:
one $^{xa}H$ is D and the other is H or D;
each $^{Ya}H$ is independently selected from H and D; and
$R^{4a}$ and $R^{5a}$ are both H;

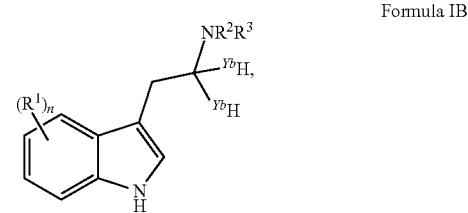

Formula IB wherein:
$R^1$ is independently selected from 5-methoxy and 5-bromo;
n is selected from 0, and 1;
$R^2$ is $CD_3$;
$R^3$ is $CD_3$ or H; and
each $^{yb}H$ is independently protium or deuterium; and a biocompatible excipient;
wherein the concentration of the freebase is from about 1 mg/mL to about 1000 mg/mL.

2. The formulation of claim 1 wherein the compound is of Formula IA and both $^{Xa}H$ or both $^{Ya}H$ are D and/or both $^{Ya}H$ are H or both $^{Ya}H$ are D.

3. The formulation of claim 1, wherein the compound is of Formula IB and n is 0; or n is 1 and $R^1$ is selected from 5-methoxy and 5-bromo.

4. The formulation of claim 1, wherein the compound is of Formula IB and $R^2$ and $R^3$ are both $CD_3$.

5. The formulation of claim 1 wherein the freebase has a purity of greater than or equal to 99% when measured by HPLC.

6. The formulation of claim 1, wherein the biocompatible excipient comprises a solvent.

7. The formulation of claim 6, wherein the solvent is selected from any one or a combination of two or more of propylene glycol, glycerine, polyethylene glycol, water, ethanol and triacetin.

8. The formulation of claim 6, wherein the solvent is selected from propylene glycol, glycerine and polyethylene glycol, or a mixture thereof.

9. The formulation of claim 6, wherein the solvent is a mixture of propylene glycol and glycerine in a ratio of from about 50:50 to about 30:70 by weight.

10. The formulation of claim 1, wherein the biocompatible excipient comprises a taste-masking agent.

11. The formulation of claim 1, having an oxygen content of less than 2 ppm.

12. The formulation of claim 1, stored in a container adapted to prevent penetration of ultraviolet light.

13. A kit suitable for preparing a parenteral formulation suitable for inhalation of claim 1, said kit comprising a freebase of a deuterium- substituted dimethyltryptamine compound, and a biocompatible excipient, which is separate to the freebase.

14. The kit of claim 13 further comprising a container adapted to prevent penetration of ultraviolet light.

15. A method of preparing a parenteral formulation suitable for inhalation as defined in claim 1, comprising contacting a freebase of a deuterium-substituted dimethyltryptamine compound, with a biocompatible excipient.

16. The method of claim 15 wherein the freebase is dissolved in a solvent selected from propylene glycol, glycerine and polyethylene glycol, or a mixture thereof to form a solution.

17. The method of claim 16 wherein the solvent is a mixture of propylene glycol and glycerine in a ratio of from about 50:50 to about 30:70 by weight.

18. The method of claim 16 comprising the step of stirring the freebase in the solvent at a temperature of from about 25° C to about 50° C.

19. The method of claim 16 further comprising sparging the solution with an inert gas.

20. The method of claim 16 comprising adding a taste-masking agent.

21. A method of treating a psychiatric or neurological disorder comprising pulmonary administration to a patient in need thereof of a parenteral formulation suitable for inhalation as defined in claim 1.

22. The method of claim 21 wherein the psychiatric or neurological disorder is selected from the group consisting of (i) an obsessive compulsive disorder, (ii) a depressive disorder, (iii) an anxiety disorder, (iv) substance abuse, and (v) an avolition disorder.

23. The method of claim 21, wherein the parenteral formulation is prepared by contacting a freebase of a deuterium-substituted dimethyltryptamine compound with a biocompatible excipient.

* * * * *